United States Patent
Fliearman et al.

(10) Patent No.: US 10,900,454 B1
(45) Date of Patent: Jan. 26, 2021

(54) INTEGRATED STARTER-GENERATOR DEVICE WITH UNIDIRECTIONAL CLUTCH ACTUATION UTILIZING A BIASED LEVER ASSEMBLY

(71) Applicant: Deere & Company, Moline, IL (US)

(72) Inventors: Steven R. Fliearman, Coffeyville, KS (US); Lisa R. Lloyd, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/840,008

(22) Filed: Apr. 3, 2020

(51) Int. Cl.
  *F02N 11/04* (2006.01)
  *F16H 61/28* (2006.01)
  (Continued)

(52) U.S. Cl.
  CPC ............... *F02N 11/04* (2013.01); *F16H 3/66* (2013.01); *F16H 61/28* (2013.01); *H02K 7/1085* (2013.01); *H02K 7/116* (2013.01); *H02K 7/1815* (2013.01); *B60K 6/26* (2013.01); *B60K 2006/268* (2013.01); *B60Y 2200/92* (2013.01); *F16D 21/00* (2013.01);
  (Continued)

(58) Field of Classification Search
  CPC . F02N 11/04; F16H 3/66; F16H 61/28; F16H 2061/2853; F16H 2200/0039; F16H 2200/2007; F16H 2200/2038; H02K 7/1085; H02K 7/116; H02K 7/1815;
  (Continued)

(56) References Cited

U.S. PATENT DOCUMENTS 3,062,073 A 11/1962 Brass
3,081,759 A 3/1963 Mauck et al.
(Continued)

FOREIGN PATENT DOCUMENTS

DE 69218975 T2 6/1994
DE 19745995 A1 9/1998
(Continued)

OTHER PUBLICATIONS

USPTO Non-Final Office Action dated Aug. 24, 2020 for U.S. Appl. No. 16/385,964.
(Continued)

*Primary Examiner* — Pedro J Cuevas
(74) *Attorney, Agent, or Firm* — Klintworth & Rozenblat IP LLP

(57) ABSTRACT

A starter-generator device for a work vehicle having an engine. The device includes a gear set for transmitting power, first and second clutches having actuation pins and shiftable relative to the gear set, first and second actuator devices moving armatures only in a first direction, and first and second linkages having a coupling region coupled to the respective armature and a second end coupled to the actuation pin. The first actuator device moves the coupling region and second end of the first linkage in the first direction. The second actuator device moves the coupling region of the second linkage in the first direction and the second end in an opposite second direction. The clutches shift into engaged or disengaged positions by the second end of the respective linkage moving one of the directions, and shift into the other engaged or disengaged position by the second end moving the other direction.

20 Claims, 12 Drawing Sheets

(51) Int. Cl.
*H02K 7/108* (2006.01)
*H02K 7/116* (2006.01)
*H02K 7/18* (2006.01)
*F16H 3/66* (2006.01)
*F16D 28/00* (2006.01)
*B60K 6/26* (2007.10)
*F16D 21/00* (2006.01)
*F16D 23/12* (2006.01)

(52) U.S. Cl.
CPC .............. *F16D 23/12* (2013.01); *F16D 28/00* (2013.01); *F16H 2061/2853* (2013.01); *F16H 2200/0039* (2013.01); *F16H 2200/2007* (2013.01); *F16H 2200/2038* (2013.01)

(58) Field of Classification Search
CPC .......................... B60K 6/26; B60K 2006/268; B60Y 2200/92; F16D 21/00; F16D 23/12; F16D 28/00
USPC ............ 290/46; 475/5; 74/329, 661; 701/22; 477/3, 5
See application file for complete search history.

(56) References Cited

U.S. PATENT DOCUMENTS

| | | | |
|---|---|---|---|
| 3,150,544 A | 9/1964 | Brass | |
| 3,640,152 A | 2/1972 | Shirai et al. | |
| 3,675,511 A | 7/1972 | Wakamatsu et al. | |
| 3,942,024 A | 3/1976 | Ingham | |
| 4,122,354 A | 10/1978 | Howland | |
| 4,213,299 A | 7/1980 | Sharar | |
| 4,473,752 A | 9/1984 | Cronin | |
| 4,484,495 A * | 11/1984 | Mason | F16H 3/54 192/12 D |
| 4,631,455 A | 12/1986 | Taishoff | |
| 4,708,030 A | 11/1987 | Cordner | |
| 4,750,384 A | 6/1988 | Belliveau | |
| 4,862,009 A | 8/1989 | King | |
| 4,926,713 A | 5/1990 | Madill | |
| 5,033,994 A | 7/1991 | Wu | |
| 5,177,968 A | 1/1993 | Fellows | |
| 5,418,400 A | 5/1995 | Stockton | |
| 5,558,173 A | 9/1996 | Sherman | |
| 5,856,709 A | 1/1999 | Ibaraki | |
| 6,371,877 B1 | 4/2002 | Schroeder et al. | |
| 6,378,479 B1 | 4/2002 | Nishidate et al. | |
| RE37,743 E | 6/2002 | Yang | |
| 6,409,622 B1 | 6/2002 | Bolz et al. | |
| 6,484,596 B2 | 11/2002 | Puchas | |
| 6,569,054 B2 | 5/2003 | Kato | |
| 6,582,333 B2 | 6/2003 | Man | |
| 6,661,109 B2 * | 12/2003 | Fukasaku | B60K 6/52 290/40 C |
| 6,746,354 B1 | 6/2004 | Ziemer | |
| 6,770,005 B2 | 8/2004 | Aikawa et al. | |
| 6,832,970 B2 | 12/2004 | Eibler | |
| 6,852,063 B2 | 2/2005 | Takahashi et al. | |
| 6,910,453 B2 | 6/2005 | Sugino et al. | |
| 6,965,173 B2 * | 11/2005 | Fukasaku | B60K 6/52 290/40 C |
| 7,028,794 B2 | 4/2006 | Odahara et al. | |
| 7,044,255 B2 * | 5/2006 | Maeda | B60K 6/44 180/242 |
| 7,086,978 B2 | 8/2006 | Aikawa et al. | |
| 7,117,965 B2 * | 10/2006 | Yatabe | B60W 10/18 180/65.235 |
| 7,223,191 B2 | 5/2007 | Aikawa et al. | |
| 7,374,031 B2 | 5/2008 | Skorucak | |
| 7,387,043 B2 | 6/2008 | Sakamoto et al. | |
| 7,503,871 B2 | 3/2009 | Kozarekar | |
| 7,582,033 B2 * | 9/2009 | Kefti-Cherif | B60K 6/365 475/5 |
| 7,753,147 B2 | 7/2010 | Usoro | |
| 7,780,562 B2 | 8/2010 | King et al. | |
| 8,143,735 B2 | 3/2012 | Bauer | |
| 8,226,517 B2 | 7/2012 | Tsai et al. | |
| 8,235,859 B2 | 8/2012 | Yun | |
| 8,480,529 B2 * | 7/2013 | Pohl | F02B 67/04 475/186 |
| 8,500,601 B2 | 8/2013 | Arnold et al. | |
| 8,584,359 B1 | 11/2013 | Bowman | |
| 8,727,944 B2 | 5/2014 | Noboru et al. | |
| 8,734,281 B2 | 5/2014 | Ai et al. | |
| 8,996,227 B2 | 3/2015 | Sisk et al. | |
| 9,017,207 B2 * | 4/2015 | Pohl | F16H 15/50 475/189 |
| 9,074,656 B2 | 7/2015 | Benz et al. | |
| 9,145,136 B2 | 9/2015 | Suntharalingam et al. | |
| 9,184,646 B2 | 11/2015 | Fulton | |
| 9,261,064 B2 | 2/2016 | Patel et al. | |
| 9,371,810 B2 | 6/2016 | Creviston | |
| 9,421,855 B2 | 8/2016 | Suntharalingam et al. | |
| 9,541,172 B1 | 1/2017 | Wright | |
| 9,555,795 B2 | 1/2017 | Nefcy et al. | |
| 9,676,265 B2 | 6/2017 | Choi | |
| 9,726,282 B2 * | 8/2017 | Pohl | F16H 15/28 |
| 10,183,569 B2 | 1/2019 | Toyota et al. | |
| 10,479,187 B2 | 11/2019 | Lubben et al. | |
| 10,518,626 B2 | 12/2019 | Pettersson | |
| 10,591,025 B2 | 3/2020 | Fliearman et al. | |
| 10,619,711 B2 * | 4/2020 | Fliearman | F16H 3/728 |
| 2001/0019210 A1 * | 9/2001 | Fukasaku | B60K 6/52 290/40 C |
| 2001/0025621 A1 | 10/2001 | Shiraishi et al. | |
| 2001/0042649 A1 * | 11/2001 | Maeda | H02K 23/06 180/65.225 |
| 2002/0019284 A1 | 2/2002 | Aikawa et al. | |
| 2002/0033059 A1 | 3/2002 | Pels et al. | |
| 2002/0117860 A1 | 8/2002 | Man et al. | |
| 2002/0139592 A1 * | 10/2002 | Fukasaku | B60W 10/06 180/65.21 |
| 2002/0177504 A1 | 11/2002 | Pels | |
| 2003/0001391 A1 | 1/2003 | Kuang et al. | |
| 2003/0104900 A1 | 6/2003 | Takahashi | |
| 2003/0224888 A1 | 12/2003 | Wilder et al. | |
| 2004/0055800 A1 | 3/2004 | Katou et al. | |
| 2004/0116226 A1 | 6/2004 | Baker et al. | |
| 2006/0111211 A1 * | 5/2006 | Kefti-Cherif | B60K 6/445 475/5 |
| 2006/0166777 A1 | 7/2006 | Aikawa et al. | |
| 2007/0108006 A1 | 5/2007 | Schmid et al. | |
| 2007/0157899 A1 | 7/2007 | Seufert et al. | |
| 2007/0265126 A1 | 11/2007 | Janson et al. | |
| 2008/0179119 A1 | 7/2008 | Grenn et al. | |
| 2008/0314195 A1 | 12/2008 | Andoh et al. | |
| 2009/0055061 A1 | 2/2009 | Zhu | |
| 2009/0176611 A1 | 7/2009 | Avery | |
| 2009/0264241 A1 | 10/2009 | Dittrich et al. | |
| 2009/0312145 A1 * | 12/2009 | Pohl | F02B 67/04 477/37 |
| 2010/0029428 A1 | 2/2010 | Abe et al. | |
| 2010/0044183 A1 | 2/2010 | Guggolz et al. | |
| 2010/0048338 A1 * | 2/2010 | Si | B60W 20/15 475/5 |
| 2010/0063704 A1 | 3/2010 | Okubo et al. | |
| 2010/0076634 A1 | 3/2010 | Brigham | |
| 2011/0010031 A1 | 1/2011 | Syed et al. | |
| 2011/0015020 A1 | 1/2011 | Grosser | |
| 2011/0053729 A1 | 3/2011 | Parsons et al. | |
| 2011/0070999 A1 | 3/2011 | Soliman et al. | |
| 2011/0263379 A1 | 10/2011 | Liang et al. | |
| 2012/0103293 A1 | 5/2012 | Robinette et al. | |
| 2012/0235473 A1 | 9/2012 | Jiang et al. | |
| 2012/0240723 A1 | 9/2012 | Gluckler et al. | |
| 2013/0046427 A1 | 2/2013 | Hohenberg | |
| 2013/0252773 A1 | 9/2013 | Suntharalingam et al. | |
| 2013/0316873 A1 | 11/2013 | Jansen et al. | |
| 2014/0011619 A1 * | 1/2014 | Pohl | F16H 61/6646 475/149 |
| 2014/0137824 A1 | 5/2014 | Jacques et al. | |
| 2014/0150604 A1 | 6/2014 | Kaltenbach | |

(56) References Cited

U.S. PATENT DOCUMENTS

| | | |
|---|---|---|
| 2014/0256490 A1 | 9/2014 | Honda |
| 2015/0226323 A1* | 8/2015 | Pohl ..................... F16H 15/50 475/2 |
| 2015/0239335 A1 | 8/2015 | Wachter et al. |
| 2016/0031438 A1 | 2/2016 | Matsui et al. |
| 2016/0031439 A1 | 2/2016 | Nefcy et al. |
| 2016/0052382 A1 | 2/2016 | Clark et al. |
| 2016/0076629 A1 | 3/2016 | Modrzejewski et al. |
| 2016/0082821 A1 | 3/2016 | Mueller et al. |
| 2016/0096522 A1 | 4/2016 | Ortmann et al. |
| 2016/0137045 A1 | 5/2016 | Zhu et al. |
| 2016/0200311 A1 | 7/2016 | Nefcy et al. |
| 2016/0207525 A1 | 7/2016 | Nefcy et al. |
| 2016/0258495 A1 | 9/2016 | Bird |
| 2016/0288780 A1 | 10/2016 | Shukla et al. |
| 2016/0348741 A1 | 12/2016 | Niemiec et al. |
| 2017/0248196 A1 | 8/2017 | Turner et al. |
| 2017/0328470 A1* | 11/2017 | Pohl ..................... F16H 15/50 |
| 2017/0368925 A1 | 12/2017 | Maki |
| 2018/0100564 A1 | 4/2018 | Fliearman et al. |
| 2018/0106365 A1 | 4/2018 | Tsukizaki et al. |
| 2018/0172124 A1 | 6/2018 | Valente et al. |
| 2018/0186230 A1 | 7/2018 | Fukuda et al. |
| 2018/0236864 A1 | 8/2018 | Imamura et al. |
| 2018/0238443 A1 | 8/2018 | Aulin et al. |
| 2018/0244145 A1 | 8/2018 | Ohnemus et al. |
| 2018/0298993 A1* | 10/2018 | Fliearman ............... B60K 6/387 |
| 2019/0084555 A1 | 3/2019 | Omura et al. |
| 2019/0160936 A1 | 5/2019 | Lubben et al. |
| 2019/0176806 A1 | 6/2019 | Trent |
| 2019/0219022 A1 | 7/2019 | Patil et al. |
| 2019/0344655 A1 | 11/2019 | Pettersson |
| 2019/0351751 A1 | 11/2019 | Sato et al. |

FOREIGN PATENT DOCUMENTS

| | | |
|---|---|---|
| DE | 000019927521 A1 | 6/2000 |
| DE | 000019911924 A1 | 9/2000 |
| DE | 000019923316 A1 | 11/2000 |
| DE | 10003741 A1 | 4/2001 |
| DE | 010007959 A1 | 8/2001 |
| DE | 102006037576 A1 | 4/2008 |
| DE | 102010030570 A1 | 12/2011 |
| DE | 102010030571 A1 | 12/2011 |
| DE | 102010060140 A1 | 4/2012 |
| DE | 102011080068 A1 | 1/2013 |
| DE | 102011089708 A1 | 6/2013 |
| DE | 102011089709 A1 | 6/2013 |
| DE | 102011089710 A1 | 6/2013 |
| DE | 112011103973 T5 | 10/2013 |
| DE | 102008045202 B4 | 3/2014 |
| DE | 102013203009 A1 | 8/2014 |
| DE | 102013012747 A1 | 9/2014 |
| DE | 102013206970 A1 | 10/2014 |
| DE | 102014200720 A1 | 2/2015 |
| DE | 102014200723 B3 | 2/2015 |
| DE | 102013219948 | 4/2015 |
| DE | 102017203026 A1 | 8/2017 |
| DE | 102017204269 A1 | 9/2017 |
| EP | 0645271 B1 | 3/1995 |
| EP | 000002272702 A2 | 1/2011 |
| EP | 2664785 | 11/2013 |
| EP | 000001069310 B4 | 3/2014 |
| GB | 0650564 | 2/1951 |
| JP | 002015116004 A | 6/2015 |
| WO | 0188369 A1 | 11/2001 |
| WO | 200700107458 A2 | 9/2007 |

OTHER PUBLICATIONS

USPTO Non-Final Office Action dated Aug. 24, 2020 for U.S. Appl. No. 16/385,784.

NTN Automotive Sales Headquarters, Compact Clutch Integrated Pulley for Alternators, NTN Technical Review No. 75, 2007.

Harmonic Drive LLC, Harmonic Planetary Precision Gearing & Motion Control, Product Brochure, Mar. 2006.

Ioan-Adrian Viorel et al., Integrated Starter-Generators for Automotive Applications, Technical University ofCluj-Romania, Dept. of Electrical Machines, vol. 45, No. 3, 2004.

North Atalantic Starter, Starter Drives Explained, Northatlan.com, 2005.

German Search Report for application No. 1020172030267 dated Aug. 4, 2017.

German Search Report for application No. 1020182189080 dated May 27, 2019.

German Search Report for application No. 1020182214956 dated May 28, 2019.

German Search Report for application No. 1020182180784 dated Jun. 4, 2019.

USPTO Final Office Action dated Mar. 8, 2019 for U.S. Appl. No. 15/056,767.

USPTO Final Office Action dated Jun. 11, 2018 for U.S. Appl. No. 15/056,767.

USPTO Non-Final Office Action dated Sep. 9, 2019 for U.S. Appl. No. 15/834,356.

USPTO Non-Final Office Action dated Nov. 2, 2017 for U.S. Appl. No. 15/056,767.

USPTO Non-Final Office Action dated Sep. 28, 2018 for U.S. Appl. No. 15/056,767.

USPTO Non-Final Office Action dated Nov. 1, 2018 for U.S. Appl. No. 15/825,520.

USPTO Non-Final Office Action dated Feb. 25, 2019 for U.S. Appl. No. 15/834,356.

USPTO Non-Final Office Action dated Mar. 4, 2020 for U.S. Appl. No. 16/385,934.

German Search Report issued in German Application No. 102020204706.5 dated Sep. 3, 2020. (7 pages).

German Search Report issued in German Application No. 102020204795.2 dated Sep. 2, 2020. (7 pages).

German Search Report issued in German Application No. 102020204705.7 dated Sep. 1, 2020. (6 pages).

German Search Report issued in German Application No. 102020204642.5 dated Sep. 4, 2020. (8 pages).

German Search Report issued in German Application No. 102020204643.3 dated Sep. 4, 2020. (7 pages).

German Search Report issued in German Application No. 102020204704.9 dated Sep. 3, 2020. (7 pages).

German Search Report issued in German Application No. 102020203063.4 dated Sep. 4, 2020. (6 pages).

German Search Report issued in German Application No. 102020204646.8 dated Sep. 1, 2020. (6 pages).

USPTO Non-Final Office Action dated Jun. 19, 2020 for U.S. Appl. No. 16/386,075.

USPTO non-final office action issued in pending Utility U.S. Appl. No. 16/386,052 dated Oct. 30, 2020.

USPTO non-final office action issued in pending Utility U.S. Appl. No. 16/385,860 dated Nov. 4, 2020.

* cited by examiner

INTEGRATED STARTER-GENERATOR DEVICE WITH UNIDIRECTIONAL CLUTCH ACTUATION UTILIZING A BIASED LEVER ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle power systems, including arrangements for starting mechanical power equipment and generating electric power therefrom.

BACKGROUND OF THE DISCLOSURE

Work vehicles, such as those used in the agriculture, construction and forestry industries, and other conventional vehicles may be powered by an internal combustion engine (e.g., a diesel engine), although it is becoming more common for mixed power sources (e.g., engines and electric motors) to be employed. In any case, engines remain the primary power sources of work vehicles and require mechanical input from a starter to initiate rotation of the crankshaft and reciprocation of the pistons within the cylinders. Torque demands for starting an engine are high, particularly so for large diesel engines common in heavy-duty machines.

Work vehicles additionally include subsystems that require electric power. To power these subsystems of the work vehicle, a portion of the engine power may be harnessed using an alternator or generator to generate AC or DC power. The battery of the work vehicle is then charged by inverting the current from the alternator. Conventionally, a belt, direct or serpentine, couples an output shaft of the engine to the alternator to generate the AC power. Torque demands for generating current from the running engine are significantly lower than for engine start-up. In order to appropriately transfer power between the engine and battery to both start the engine and generate electric power, a number of different components and complex devices are typically required, thereby raising issues with respect to cost, assembly errors, and complexity.

SUMMARY OF THE DISCLOSURE

This disclosure provides a combined engine starter and electric power generator device with an integral transmission, such as may be used in work vehicles for engine cold start and to generate electric power, thus serving the dual purposes of an engine starter and an alternator for power transmission to and from the engine with more robust construction of an actuation assembly for engaging gears of a transmission.

In one aspect, the disclosure provides a combination starter-generator device for a work vehicle having an engine. The starter-generator device includes a gear set configured to transmit power flow to and from the engine, a first clutch, a second clutch, a first actuator device, a first linkage, a second actuator device, and a second linkage. The clutch has an actuation pin and is shiftable into a disengaged position in which the clutch is decoupled from the gear set and into an engaged position in which the clutch is coupled to the gear set. The first actuator device applies an actuation force to an armature only in a first axial direction. The first linkage defines a first end that is fixed and extending to a second end coupled to the first actuation pin of the first clutch, the first armature engaging the first linkage at a coupling region between the first and second ends. The second actuator device applies a second actuation force to a second armature in the first axial direction. The second linkage defines a first end that is fixed and extending to a second end coupled to the second actuation pin of the second clutch, the second armature engaging the second linkage at a coupling region between the first and second ends. The first actuator device extends the first armature in the first axial direction to move the second end of the first linkage in the first axial direction; wherein the first clutch is moved into either the engaged position or the disengaged position by the coupling region of the first linkage moving in the first axial direction and the second end of the first linkage moving in the first axial direction; and wherein the first clutch is moved into the other of the engaged position or the disengaged position by the coupling region of the first linkage moving in a second axial direction and the second end of the first linkage moving in the second axial direction, the second axial direction being opposite the first axial direction. The second actuator device extends the second armature in the first axial direction to move the second end of the second linkage in the second axial direction; wherein the second clutch is moved into either the engaged position or the disengaged position by the coupling region of the second linkage moving in the first axial direction and the second end of the second linkage moving in the second axial direction; and wherein the second clutch is moved into the other of the engaged position or the disengaged position by the coupling region of the second linkage moving in the second axial direction and the second end of the second linkage moving in the first axial direction.

In another aspect, the disclosure provides a combination starter-generator device for a work vehicle having an engine. The starter-generator device includes an electric machine defining a rotation axis, a gear set configured to receive rotational input from the electric machine and from the engine and to couple the electric machine and the engine, two or more clutches selectively coupled to the gear set, an actuation assembly, a first linkage, and a second linkage. The gear set is configured to operate in one of at least a first gear ratio, a second gear ratio, or a third gear ratio. The two or more clutches are selectively coupled to the gear set to effect the first, second, and third gear ratios, the two or more clutches including a first clutch having a first actuation pin and a second clutch having a second actuation pin, each of the two or more clutches shiftable into a disengaged position in which the clutch is decoupled from the gear set and into an engaged position in which the clutch is coupled to the gear set. The actuation assembly has a first electromechanical solenoid device applying an actuation force to a first armature only in a first axial direction parallel to the rotation axis and a second electromechanical solenoid device applying an actuation force to a second armature only in the first axial direction. The first linkage defines a first end that is fixed and extending to a second end that is coupled to the first actuation pin of the first clutch, the first armature engaging the first linkage at a coupling region between the first and second ends. The second linkage defines a first end that is fixed and extending to a second end that is coupled to the second actuation pin of the second clutch, the second armature engaging the second linkage at a coupling region between the first and second ends. The first electromechanical solenoid device extends the first armature in the first axial direction to move the second end of the first linkage in the first axial direction; wherein the first clutch is moved into either the engaged position or the disengaged position by the coupling region of the first linkage moving in the first axial direction and the second end of the first linkage moving in the first axial direction; and wherein the first clutch is moved into the other of the engaged position or the disengaged position by the coupling region of the first linkage moving in a second axial direction and the second end of the first linkage moving in the second axial direction, the second axial direction being opposite the first axial direction. The second electromechanical solenoid device extends the second armature in the first axial direction to move the second end of the second linkage in the second axial direction; wherein the second clutch is moved into either the engaged position or the disengaged position by the coupling region of the second linkage moving in the first axial direction and the second end of the second linkage moving in the second axial direction; and wherein the second clutch is moved into the other of the engaged position or the disengaged position by the coupling region of the second linkage moving in the second axial direction and the second end of the second linkage moving in the first axial direction.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
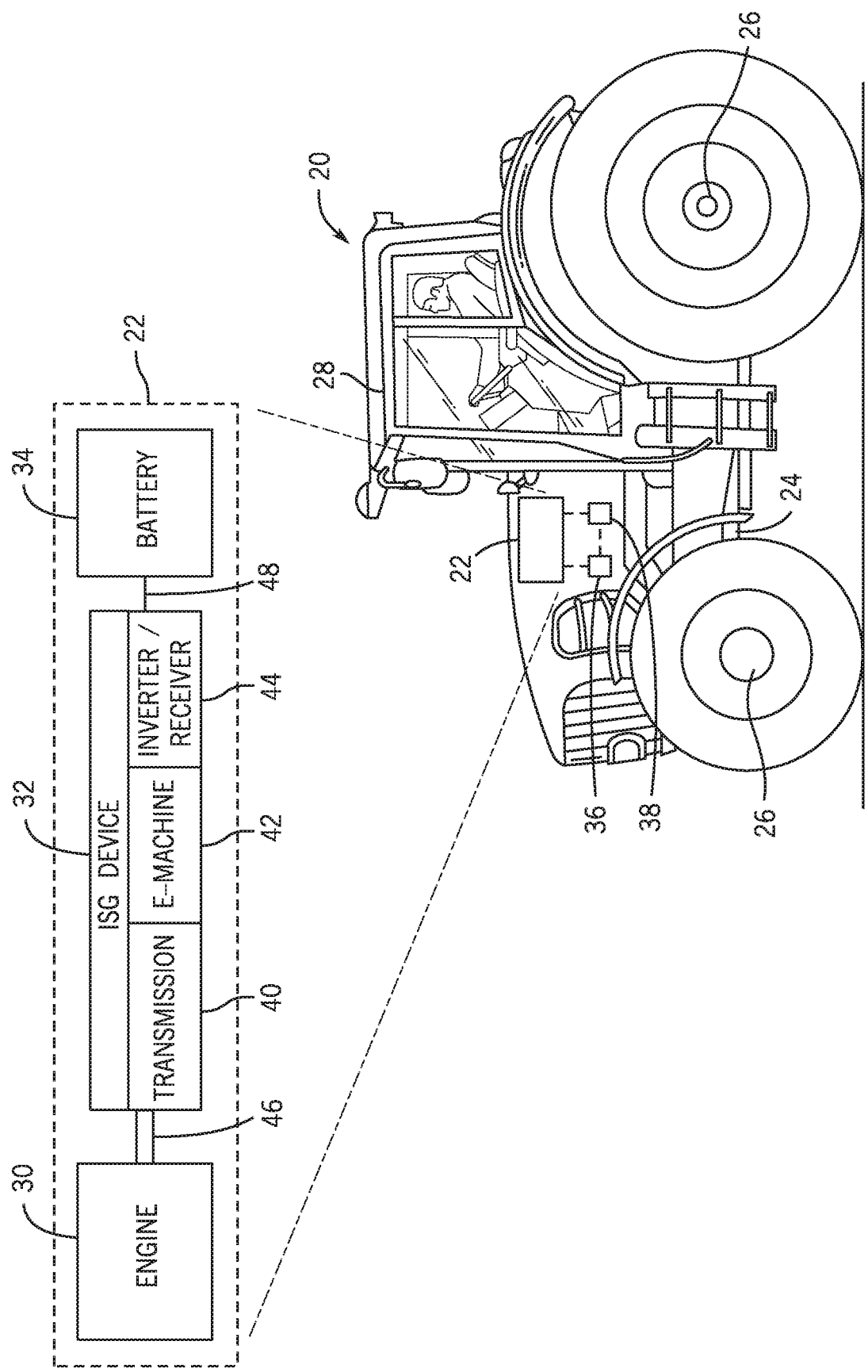
FIG. 1 is a schematic side view of an example work vehicle in the form of an agricultural tractor in which the disclosed integrated starter-generator device may be used.

The following describes one or more example embodiments of the disclosed starter-generator device, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Overview

Vehicle power systems may include an internal combustion engine and/or one or more batteries (or other chemical power source) that power various components and subsystems of the vehicle. In certain electric vehicles, a bank of batteries powers the entire vehicle including the drive wheels to impart motion to the vehicle. In hybrid gas and electric vehicles, the motive force may alternate between engine and electric motor power, or the engine power may be supplemented by electric motor power. In still other vehicles, the electric power system is used to initiate engine start up and to run the non-drive electric systems of the vehicle. In the latter case, the vehicle typically has a starter motor that is powered by the vehicle battery to turn the engine crankshaft to move the pistons within the cylinders. In further scenarios, the electric power system may provide a boost to an operating engine.

Some engines (e.g., diesel engines) initiate combustion by compression of the fuel, while other engines rely on a spark generator (e.g., spark plug), which is powered by the battery. Once the engine is operating at a sufficient speed, the power system may harvest the engine power to power the electric system as well as to charge the battery. Typically, this power harvesting is performed with an alternator or other type of power generator. The alternator converts alternating current (AC) power to direct current (DC) power usable by the battery and vehicle electric components by passing the AC power through an inverter (e.g., diode rectifier). Conventional alternators harness power from the engine by coupling a rotor of the alternator to an output shaft of the engine (or a component coupled thereto). Historically this was accomplished by the use of a dedicated belt, but in some more modern vehicles the alternator is one of several devices that are coupled to (and thus powered by) the engine via a single "serpentine" belt.

In certain applications, such as in certain heavy-duty machinery and work vehicles such as agricultural tractors, it may be disadvantageous to have separate starter and generator components. Such separate components require separate housings, which may require separate sealing or shielding from the work environment and/or occupy separate positions within the limited space of the engine compartment. Other engine compartment layout complexities may arise as well.

The following describes one or more example implementations of an improved vehicle power system that addresses one or more of these (or other) matters with conventional systems. In one aspect, the disclosed system includes a combination or integrated device that performs the engine cranking function of a starter motor and the electric power generating function of a generator. The device is referred to herein as an integrated starter-generator device ("ISG" or "starter-generator"). This terminology is used herein, at least in some implementations of the system, to be agnostic to the type of power (i.e., AC or DC current) generated by the device. In some implementations, the starter-generator device may function to generate electricity in a manner of what persons of skill in the art may consider a "generator" device that produces DC current directly. However, as used herein, the term "generator" shall mean producing electric power of static or alternating polarity (i.e., AC or DC). Thus, in a special case of the starter-generator device, the electric power generating functionality is akin to that of a conventional alternator, and it generates AC power that is subsequently rectified to DC power, either internally or externally to the starter-generator device.

In certain embodiments, the starter-generator device may include a direct mechanical power coupling to the engine that avoids the use of belts between the engine and the starter-generator device. For example, the starter-generator device may include within its housing a power transmission assembly with a gear set that directly couples to an output shaft of the engine. The gear set may take any of various forms including arrangements with enmeshing spur or other gears as well as arrangements with one or more planetary gear sets. Large gear reduction ratios may be achieved by the transmission assembly such that a single electric machine (i.e., motor or generator) may be used and operated at suitable speeds for one or more types of engine start up, as well as electric power generation. The direct power coupling between the starter-generator device and engine may increase system reliability, cold starting performance, and electric power generation of the system.

Further, in certain embodiments, the starter-generator device may have a power transmission assembly that automatically and/or selectively shifts gear ratios (i.e., shifts between power flow paths having different gear ratios). By way of example, the transmission assembly may include one or more passive or active engagement components that engage or disengage to effect power transmission through a power flow path. In this manner, bi-directional or other clutch (or other) configurations may be employed to carry out the cranking and generating functions with the appropriate control hardware. As a result of the bi-directional nature of the power transmission assembly, the power transfer belt arrangement may be implemented with only a single belt tensioner, thereby providing a relatively compact and simple assembly. In addition to providing torque in two different power flow directions, the gear set may also be configured and arranged to provide power transmission from the electric machine to the engine at one of two different speeds, e.g., according to different gear ratios. The selection of speed may provide additional functionality and flexibility for the power transmission assembly.

In one example, the combination starter-generator may further include a clutch arrangement with first, second, and third clutches that are actuated with an actuation assembly. As described below, the actuation assembly employs actuators that are powered in only one direction, such as push-only or pull-only electromechanical solenoids, also referred to herein as "unidirectional actuators." Such unidirectional actuators may also be less costly than more complicated alternatives. The actuators function to engage and/or disengage the clutches to a gear set of a power transmission assembly. In certain examples, each actuator device includes an electromechanical solenoid that converts electrical energy into a mechanical linear force (e.g., pushing or pulling). The electromechanical solenoid may include an electrical inductive coil wound around a cylindrical tube with a ferromagnetic actuator or armature that slides in and out of the coils. In particular, when electrical current flows through the coils, the resulting magnetic field repositions the armature, and changes in the current (or removing the current) further repositions the armature. The armatures of the solenoid devices are connected via linkage assemblies to the clutches, thereby axially shifting the clutches between engaged and disengaged positions to modify the power flow within the power transmission assembly.

Moreover, the actuator devices are mounted with one orientation on only one side of a housing component. The actuator devices may be identical to each other regardless of the desired movement of a respective clutch. In certain examples, the actuator devices may be push-only solenoids that are each mounted on an axial side of a base of a housing component that is oriented away from the clutches and the gear set. Because the same actuator devices are mounted in the same location and manner, the assembly process is simplified, reducing errors and saving costs. It will be appreciated that all of the actuators may be assembled onto a housing from one side and attached in the same manner regardless of the desired movement of the corresponding clutch.

The disclosed combination starter-generator device provides a linkage assembly providing a coupling arrangement between the actuator and the clutch. The linkage assembly includes a linkage that is resiliently biased to move in an opposite direction to the actuation direction provided by the actuator. For example, the linkage may be a leaf spring that functions as a lever and a return spring. In this manner, the actuator does not need to power movement back into a de-energized return position and likewise disengage or re-engage the clutch.

Additionally, the disclosed linkage assemblies of the combination starter-generator device are configurable to bias and move in either axial direction. The linkages operate as levers that are fixedly mounted to a housing component at one end and pre-loaded when attached to an actuator pin of a clutch by being forced from an unstressed position to an installed position. The resilient pre-load is configured to reverse motion when the respective actuator is de-energized. If the clutch is required to move in the opposite axial direction to the direction of actuator extension when the actuator is energized, one or more fulcrums may be provided to engage the linkage and cause a pivoting motion. The pivoting motion of the linkage results in movement in a second axial direction for the clutch, while the pre-loaded linkage is then biased to move the clutch and the actuator back to the disengaged/de-energized position.

The disclosed combination starter-generator device may provide advantageous timing and costs for manufacture, assembly, and repair. The unidirectional actuators are low cost and are implemented throughout the actuation assembly. Certain components may be consolidated as unitary parts of one component, which enhances these benefits. For example, the linkages may be formed as a unitary part of a base of the housing. In other examples, the fulcrums are formed as unitary parts of a cover of the housing. Moreover, actuation pins of the clutches may be formed as unitary parts of the clutches.

Generally, an actuator device may be any suitable device that, upon command, applies an actuation force to a coupled element. In one example, the energize, activate, or extend command for solenoid devices results in a respective armature being pushed out of the solenoid device, which may occur from applying a current to the coil within the solenoid to push the armature out of the solenoid or from discontinuing current to the coil such that a spring pushes the armature out of the solenoid, or vice versa. In other examples, depending on configuration of the linkage and/or position of the solenoid assembly, the energize, activate, or retract command for a solenoid device may result in the armature pulling into the solenoid device in order to engage (or disengage) the associated clutch.

Various implementations will be discussed in greater detail below.

Example Embodiments of the Work Vehicle and Integrated Starter-Generator Device

Referring to the drawings, an example work vehicle power system as a drivetrain assembly will be described in detail. As will become apparent from the discussion herein, the disclosed system may be used advantageously in a variety of settings and with a variety of machinery. For example, referring now to FIG. 1, a work vehicle 20 such as an agricultural tractor includes a power system (or drivetrain assembly) 22. It will be understood, however, that other configurations may be possible, including configurations with work vehicle 20 as a different kind of tractor, or as a work vehicle used for other aspects of the agriculture industry or for the construction and forestry industries (e.g., a harvester, a log skidder, a motor grader, and so on). It will further be understood that aspects of the power system 22 may also be used in non-work vehicles and non-vehicle applications (e.g., fixed-location installations).

Briefly, the work vehicle 20 has a main frame or chassis 24 supported by ground-engaging wheels 26, at least the front wheels of which are steerable. The chassis 24 supports the power system 22 and an operator cabin 28 in which operator interface and controls (e.g., various joysticks, switches levers, buttons, touchscreens, keyboards, speakers and microphones associated with a speech recognition system) are provided.

As schematically shown, the power system 22 includes an engine 30, an integrated starter-generator device 32, a battery 34, and a controller 36. The engine 30 may be an internal combustion engine or other suitable power source that is suitably coupled to propel the work vehicle 20 via the wheels 26, either autonomously or based on commands from an operator. The battery 34 may represent any one or more suitable energy storage devices that may be used to provide electric power to various systems of the work vehicle 20.

The starter-generator device 32 couples the engine 30 to the battery 34 such that the engine 30 and battery 34 may selectively interact in at least four modes. In a first (or cold engine start) mode, the starter-generator device 32 converts electric power from the battery 34 into mechanical power to drive the engine 30 at a first gear ratio corresponding to a relatively high speed, e.g., during a relatively cold engine temperature at start up. In a second (or warm engine start) mode, the starter-generator device 32 converts electric power from the battery 34 into mechanical power to drive the engine 30 at a second gear ratio corresponding to a relatively low speed, e.g., during a relatively warm engine temperature at start up. In a third (or boost) mode, the starter-generator device 32 converts electric power from the battery 34 into mechanical power at a third gear ratio corresponding to a relatively low speed to drive the engine 30 for an engine boost. In a fourth (or generation) mode, the starter-generator device 32 converts mechanical power at a fourth (or the third) gear ratio from the engine 30 into electric power to charge the battery 34. Additional details regarding operation of the starter-generator device 32 during the engine start modes, the boost mode, and the generation mode are provided below.

As introduced above, the controller 36 may be considered part of the power system 22 to control various aspects of the work vehicle 20, particularly characteristics of the power system 22. The controller 36 may be a work vehicle electronic controller unit (ECU) or a dedicated controller. In some embodiments, the controller 36 may be configured to receive input commands and to interface with an operator via a human-machine interface or operator interface (not shown) and from various sensors, units, and systems onboard or remote from the work vehicle 20; and in response, the controller 36 generates one or more types of commands for implementation by the power system 22 and/or various systems of work vehicle 20. In one example and as discussed in greater detail below, the controller 36 may command current to electromagnets associated with an actuator assembly to engage and/or disengage clutches within the starter-generator device 32. Other mechanisms for controlling such clutches may also be provided.

Generally, the controller 36 may be configured as computing devices with associated processor devices and memory architectures, as hydraulic, electrical or electro-hydraulic controllers, or otherwise. As such, the controller 36 may be configured to execute various computational and control functionality with respect to the power system 22 (and other machinery). The controller 36 may be in electronic, hydraulic, or other communication with various other systems or devices of the work vehicle 20. For example, the controller 36 may be in electronic or hydraulic communication with various actuators, sensors, and other devices within (or outside of) the work vehicle 20, including various devices associated with the power system 22. Generally, the controller 36 generates the command signals based on operator input, operational conditions, and routines and/or schedules stored in the memory. For example, the operator may provide inputs to the controller 36 via an operator input device that dictates the appropriate mode, or that at least partially defines the operating conditions in which the appropriate mode is selected by the controller 36. In some examples, the controller 36 may additionally or alternatively operate autonomously without input from a human operator. The controller 36 may communicate with other systems or devices (including other controllers) in various known ways, including via a CAN bus (not shown), via wireless or hydraulic communication means, or otherwise.

Additionally, power system 22 and/or work vehicle 20 may include a hydraulic system 38 with one or more electro-hydraulic control valves (e.g., solenoid valves) that facilitate hydraulic control of various vehicle systems, particularly aspects of the starter-generator device 32. The hydraulic system 38 may further include various pumps, lines, hoses, conduits, tanks, and the like. The hydraulic system 38 may be electrically activated and controlled according to signals from the controller 36. The hydraulic system 38 may be omitted.

In one example, the starter-generator device 32 includes a power transmission assembly (or transmission) 40, an electric machine (or motor) 42, and an inverter/rectifier device 44, each of which may be operated according to command signals from the controller 36. The power transmission assembly 40 enables the starter-generator device 32 to interface with the engine 30, particularly via a crank shaft 46 or other power transfer element of the engine 30, such as an auxiliary drive shaft. The power transmission assembly 40 may include one or more gear sets in various configurations to provide suitable power flows and gear reductions, as described below. The power transmission assembly 40 variably interfaces with the electric machine 42 in one or two different power flow directions such that the electric machine 42 operates as a motor during the engine start and boost modes and as a generator during the generation mode. In one example discussed below, the power transmission assembly 40 is coupled to the electric machine 42 via a power transfer belt arrangement. This arrangement, along with the multiple gear ratios provided by the power transmission assembly 40, permits the electric machine 42 to operate within optimal speed and torque ranges in one or both power flow directions. The inverter/rectifier device 44 enables the starter-generator device 32 to interface with the battery 34, such as via direct hardwiring or a vehicle power bus 48. In one example, the inverter/rectifier device 44 inverts DC power from the battery 34 into AC power during the engine start modes and rectifies AC power to DC power in the generation mode. In some embodiments, the inverter/rectifier device 44 may be a separate component instead of being incorporated into the starter-generator device 32. Although not shown, the power system 22 may also include a suitable voltage regulator, either incorporated into the starter-generator device 32 or as a separate component.

Figure 2:
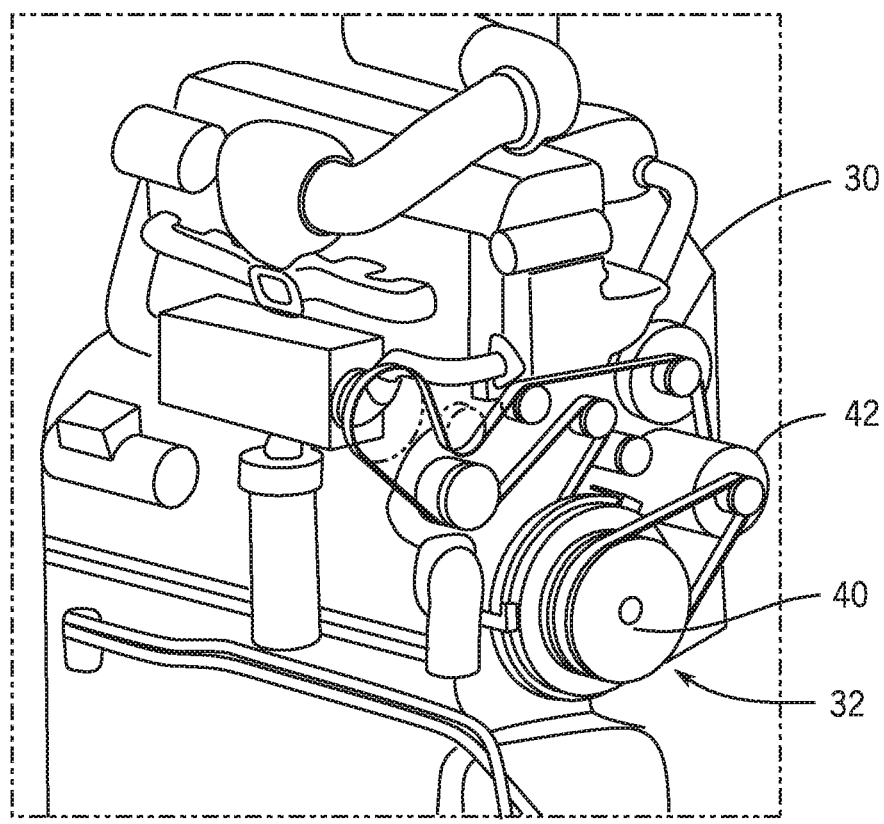
FIG. 2 is a simplified partial isometric view of an engine of the work vehicle of FIG. 1 showing an example mounting location for an example starter-generator device.

Reference is briefly made to FIG. 2, which depicts a simplified partial isometric view of an example mounting location of the starter-generator device 32 relative to the engine 30. In this example, the integrated starter-generator device 32 mounts directly and compactly to the engine 30 so as not to project significantly from the engine 30 (and thereby enlarge the engine compartment space envelope) or interfere with various plumbing lines and access points (e.g., oil tubes and fill opening and the like). Notably, the starter-generator device 32 may generally be mounted on or near the engine 30 in a location suitable for coupling to an engine power transfer element (e.g., a crank shaft 46 as introduced in FIG. 1).

Figure 3:
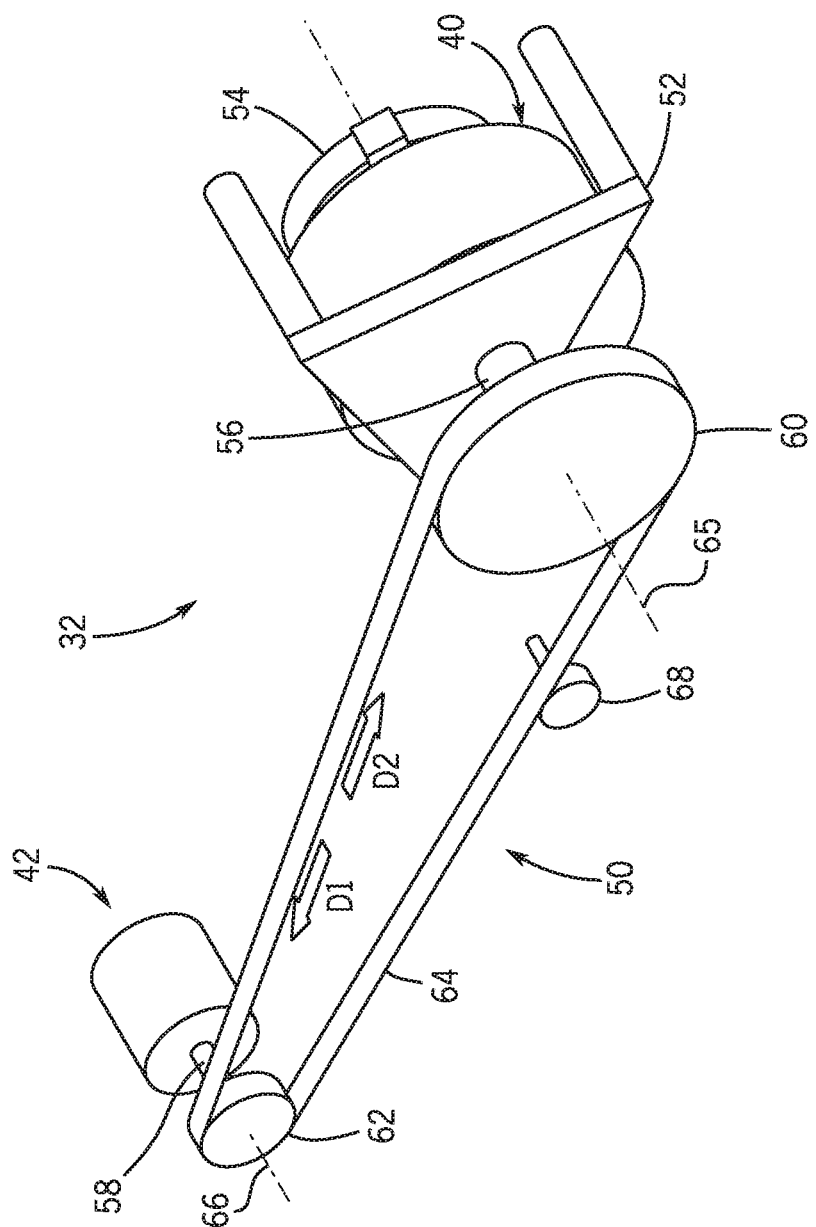
FIG. 3 is a schematic diagram of a portion of a power transfer arrangement of the work vehicle of FIG. 1 having an example starter-generator device.

Reference is additionally made to FIG. 3, which is a simplified schematic diagram of a power transfer belt arrangement 50 between the power transmission assembly 40 and electric machine 42 of the starter-generator device 32. It should be noted that FIGS. 2 and 3 depict one example physical integration or layout configuration of the starter-generator device 32, but other arrangements may be provided. In FIG. 3, the power transmission assembly 40 is mounted to the engine 30 and may be supported by a reaction plate 52. As shown, the power transmission assembly 40 includes a first power transfer element 54 that is rotatably coupled to a suitable drive element of the engine 30 and a second power transfer element 56 in the form of a shaft extending on an opposite side of the power transmission assembly 40 from the first power transfer element 54. Similarly, the electric machine 42 is mounted on the engine 30 and includes a further power transfer element 58.

The power transfer belt arrangement 50 includes a first pulley 60 arranged on the second power transfer element 56 of the power transmission assembly 40, a second pulley 62 arranged on the power transfer element 58 of the electric machine 42, and a belt 64 that rotatably couples the first pulley 60 to the second pulley 62 for collective rotation. As described in greater detail below, during the engine start modes, the electric machine 42 pulls the belt 64 to rotate the first and second pullies 60, 62 in a first clock direction D1 to drive the power transmission assembly 40 (and thus the engine 30); during the boost mode, the electric machine 42 pulls the belt 64 to rotate the first and second pullies 60, 62 in a second clock direction D2 to drive the power transmission assembly 40 (and thus the engine 30); and during the generation mode, the power transmission assembly 40 enables the engine 30 to pull the belt 64 and rotate the first and second pullies 60, 62 in the second clock direction D2 to drive the electric machine 42. The first pulley 60 defines a primary rotational axis 65 that may be coaxial with the first power transfer element 54 and other components of the power transmission assembly 40, as discussed below. The second pulley 62 defines a secondary rotational axis 66 that is coaxial with rotation of the electric machine 42. The second rotational axis 66 is parallel or substantially parallel with the primary rotational axis 65.

As a result of the bi-directional configuration, the power transfer belt arrangement 50 may include only a single belt tensioner 68 to apply tension to a single side of the belt 64 in both directions D1, D2. Using a single belt tensioner 68 to tension the belt 64 is advantageous in that it reduces parts and complexity in comparison to a design that requires multiple belt tensioners. As described below, the bi-directional configuration and associated simplified power transfer belt arrangement 50 are enabled by the bi-directional nature of the gear set in the power transmission assembly 40. Additionally, a difference in the circumferences of the first and second pulleys 60, 62 provides a change in the gear ratio between the power transmission assembly 40 and the electric machine 42. In one example, the power transfer belt arrangement 50 may provide a gear ratio of between 3:1-5:1, particularly a 4:1 ratio.

Figure 4:
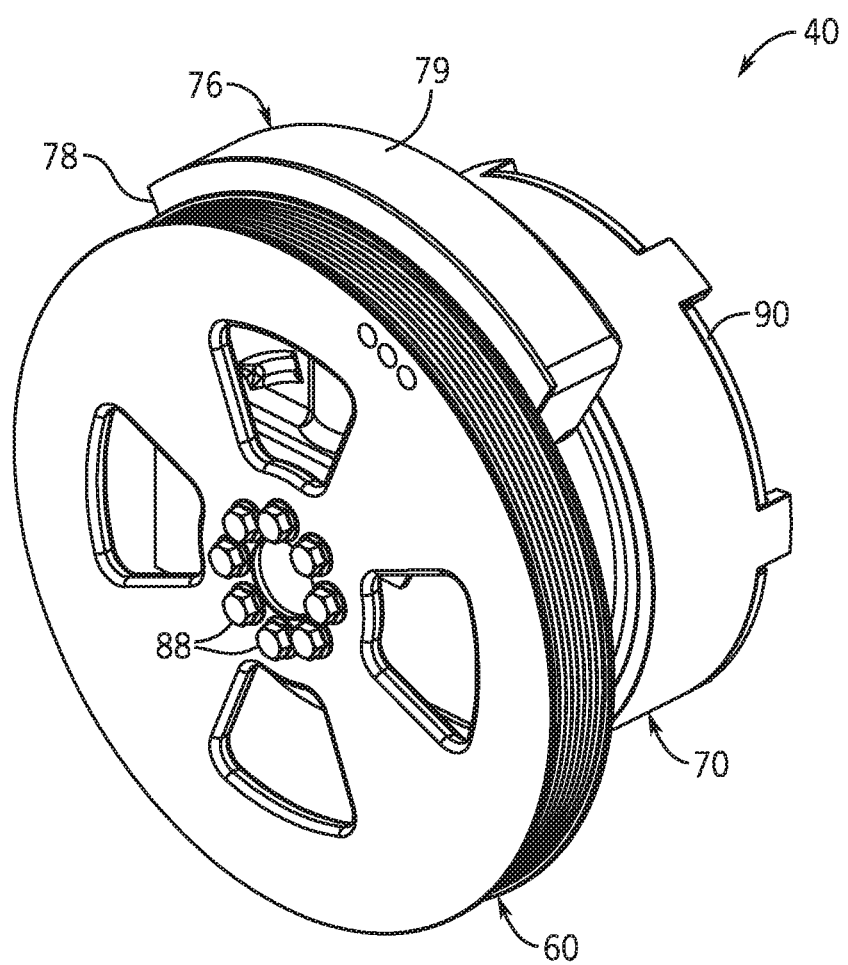
FIG. 4 is an isometric side view of a power transmission assembly of the example starter-generator device that may be implemented in the work vehicle of FIG. 1.
Figure 5:
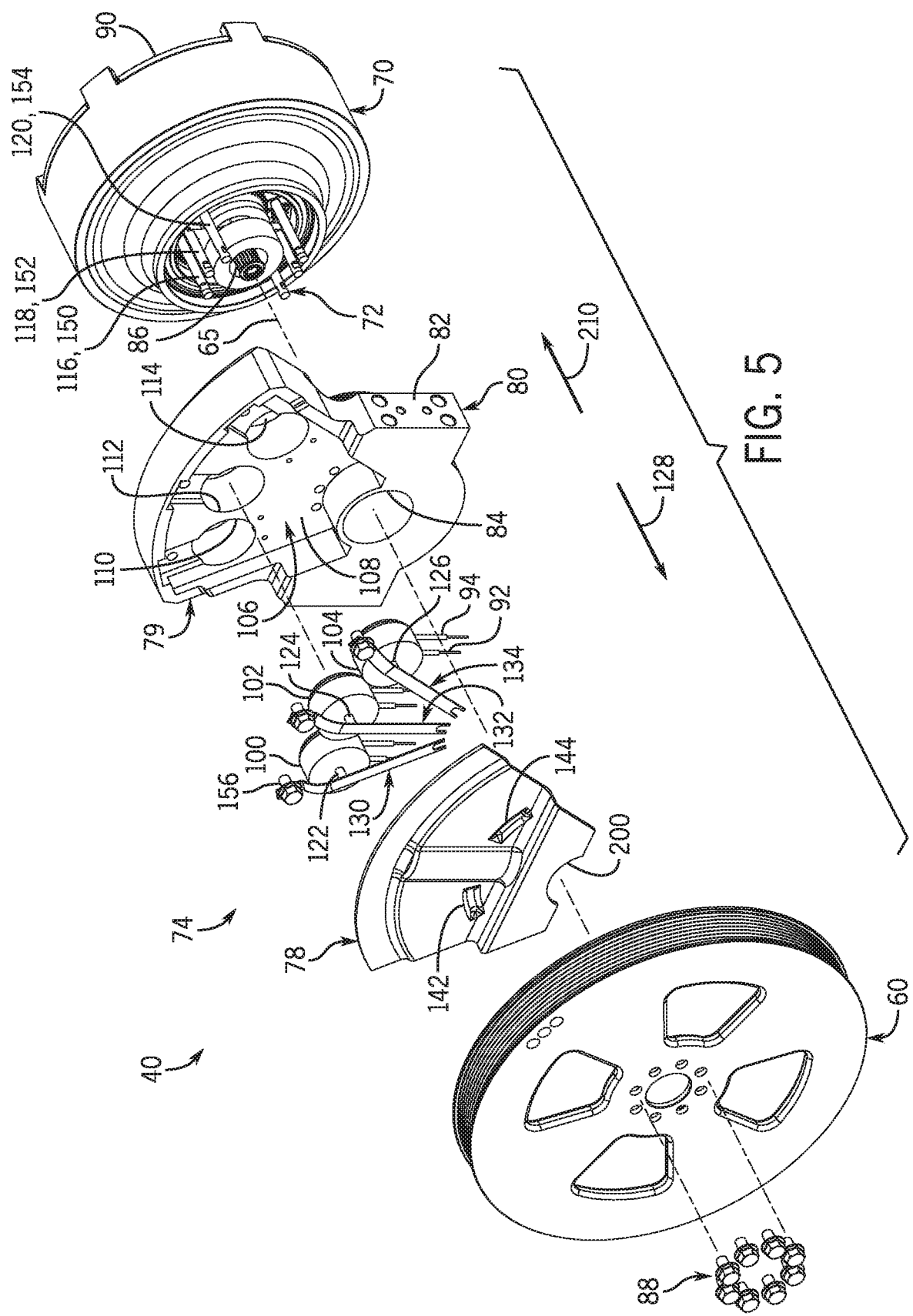
FIG. 5 is an exploded isometric view of the power transmission assembly of FIG. 4 for the example starter-generator device.

Reference is now made to FIG. 4, which is a more detailed isometric side view of the power transmission assembly 40 of the example starter-generator device, and FIG. 5, which is an exploded isometric view of the power transmission assembly 40. In one example, the power transmission assembly 40 includes a gear set 70, a clutch arrangement 72, and an actuation apparatus 74 supported by a primary housing 76. As described below, the gear set 70 operates to transfer torque between the engine 30 and electric machine 42 at predetermined gear ratios that are selected based on the status of the clutch arrangement 72, which is controlled by the actuation apparatus 74 based on signals from the controller 36. Each aspect of an example power transmission assembly 40 will be discussed below.

The housing 76 of the power transmission assembly 40 includes a cover 78, a base 79, and a housing mounting arrangement 80. In one example, the housing mounting arrangement 80 is formed by one or more side walls 82 formed in the primary housing 76 that function to mount the power transmission assembly 40 to the engine 30 (FIG. 1). Generally, the base 79 and the cover 78 are configured to support, shield, and/or protect other portions of the power transmission assembly 40. As shown, the base 79 includes an central opening 84 that enables the power transfer element 56 from the pulley 60 (e.g., as discussed above with reference to FIG. 3) to be rotationally coupled to an input shaft 86 of the power transmission assembly 40, which in turn is coupled to the gear set 70 of the power transmission assembly 40. In one example, the pulley 60 may be rotationally coupled to the input shaft 86 with one or more fasteners 88 positioned proximate or in the central opening 84 of the primary housing 76.

On one end of the power transmission assembly 40, a drive plate 90 is coupled to the gear set 70 as a power transfer element (e.g., element 54 of FIG. 3). Generally, the drive plate 90 facilitates coupling the power transmission assembly 40 to the engine 30 (FIG. 3). In one example, the drive plate 90 is coupled to the engine crank shaft. The drive plate 90 may also operate as a torsional damper in order to dampen vibrations at the crankshaft of the engine 30 (FIG. 3).

The actuation apparatus 74 includes a first (or low) actuator device 100, a second (or high) actuator device 102, and a third (or mid) actuator device 104 that interact with the clutch arrangement 72. Each of the first, second, and third actuator devices 100, 102, 104 includes at least one connection element 92, 94 that enables commands and/or power between the respective actuator device 100, 102, 104, the controller 36 (FIG. 1), and/or other sources. The connection elements 92, 94 may be wired or wireless connections. Positioning the first, second, and third actuator devices 100, 102, 104 around the outer perimeter of the base 79 of the housing 76 may facilitate wire routing, if applicable, between the controller 36 and the connection elements 92, 94.

Figure 6:
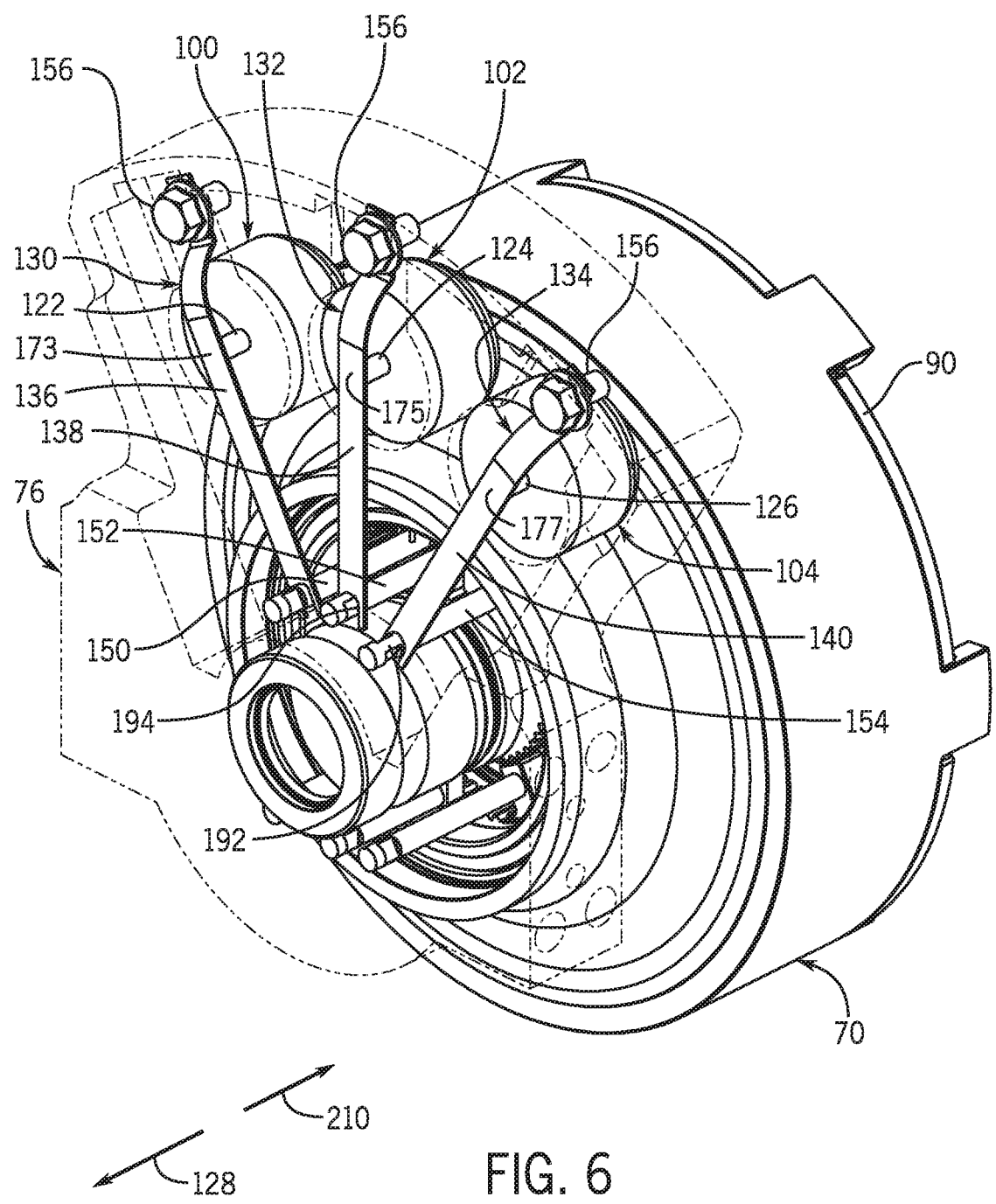
FIG. 6 is a partial isometric view of portions of an actuation apparatus of the power transmission assembly of FIG. 5 for the example starter-generator device.
Figure 7:
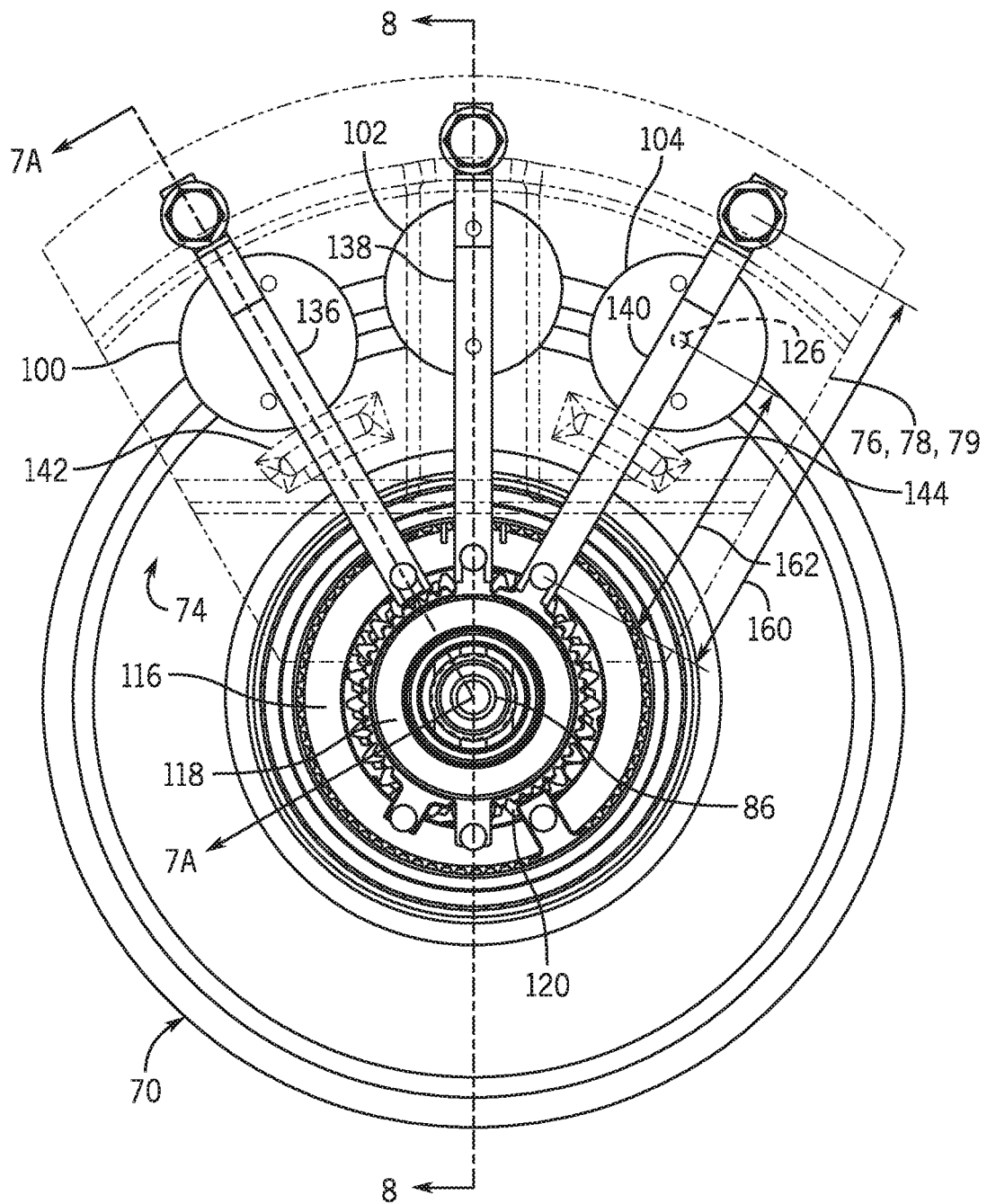
FIG. 7 is a partial first end view of the actuation apparatus of the power transmission assembly of FIG. 6 for the example starter-generator device.
Figure 9:
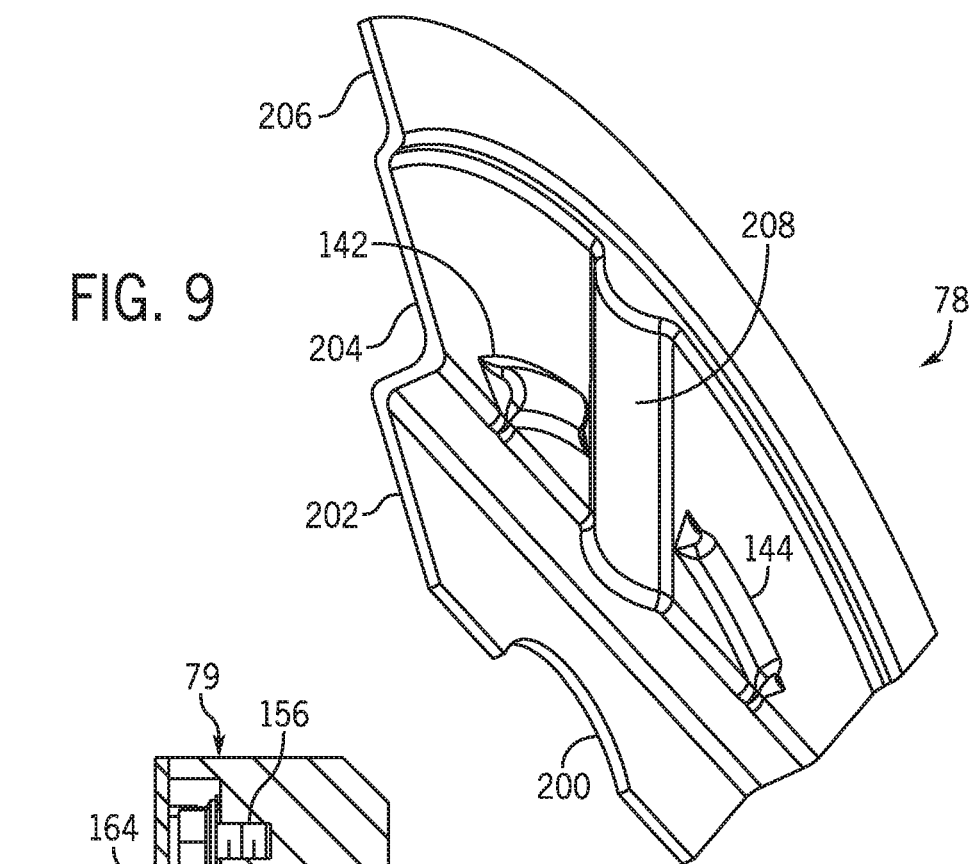
FIG. 9 is a partial isometric view of an example housing cover of the power transmission assembly of FIG. 6.
Figure 7A:
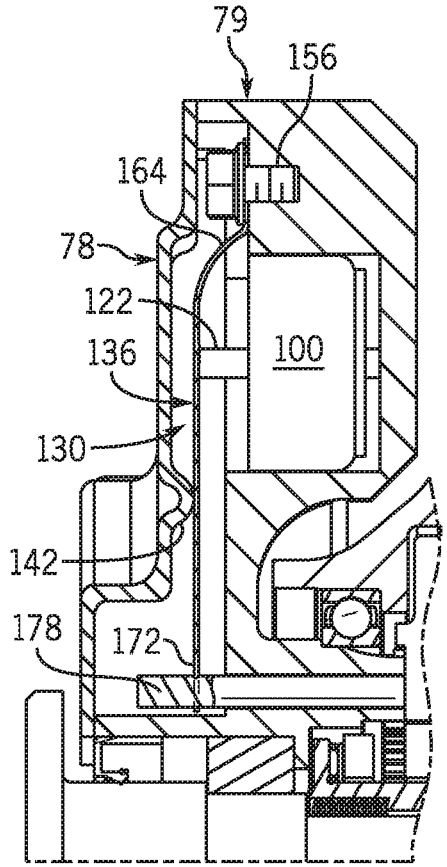
FIG. 7A is a partial side cross-sectional view of the power transmission assembly through line 7A-7A of FIG. 7 for the example starter-generator device.

Reference is now additionally made to FIGS. 6 and 7, which include a partial isometric view and an end view, respectively, of portions of the power transmission assembly 40 with the housing 76 shown in relief to more clearly depict the actuation apparatus 74. The housing 76 defines an opening 96 to accommodate the coupling between the power transfer element 56 and the input shaft 86 into the power transmission assembly 40. In some examples, the power transfer element 56 and the input shaft 86 are a single unitary part. The opening 96 in the primary housing 76 also accommodates the connections between the actuation apparatus 74 and the clutch arrangement 72, as discussed below.

The base 79 of the housing 76 additionally supports the first, second, and third actuator devices 100, 102, 104. Specifically, an upper side (electric machine side) of the base 79 constitutes a reaction member 106 including an upper face 108 and first, second, and third recesses 110, 112, 114 that support the respective actuator devices 100, 102, 104. In the depicted example, the actuation apparatus 74 includes one each of the first, second, and third actuator devices 100, 102, 104 that are electromechanical solenoid devices, although other examples may have different numbers and types of actuator devices (e.g., linear actuators). The first, second, and third actuator devices 100, 102, 104 are respectively attached to low, high, and mid clutches 116, 118, 120. It will be appreciated that each of the first, second, and third actuator devices 100, 102, 104 in the illustrated example are mounted only on one face (upper face 108) of the reaction member 106 and only act in one axial direction (push-only), allowing for consistent orientation and simplified assembly of the actuation apparatus 74. In particular, each of the first, second, and third actuator device 100, 102, 104 activates to power movement of an armature 122, 124, 126 in only a first axial direction 128 (e.g., in the direction of the electric machine).

Figure 11:
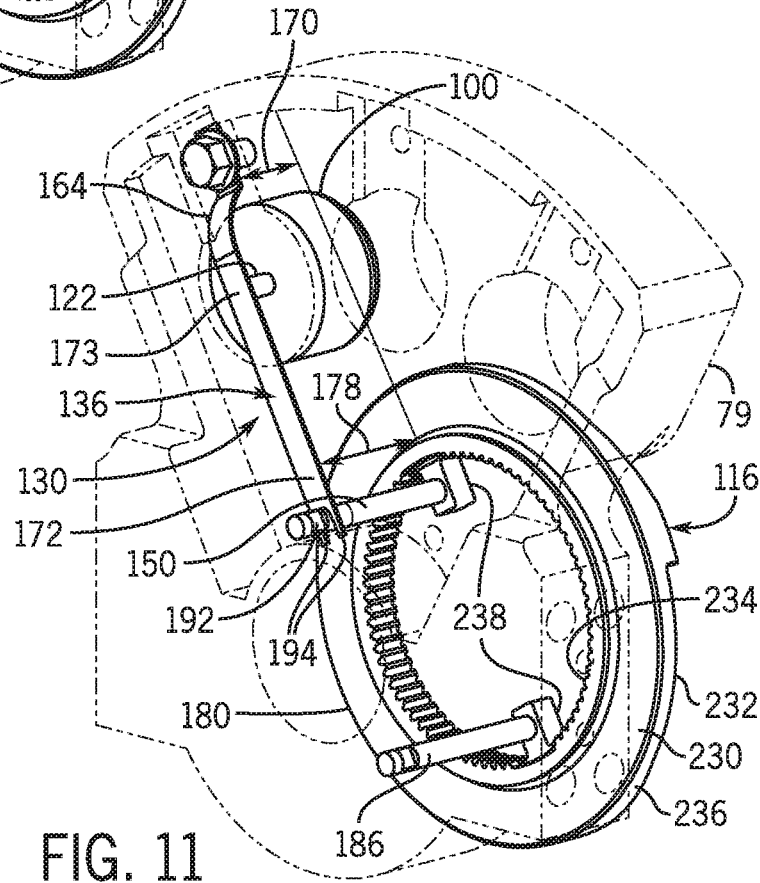
FIG. 11 is an isometric view of a first portion of the actuation apparatus and clutch arrangement removed from the power transmission assembly of FIG. 4 for the example starter-generator device.
Figure 12:
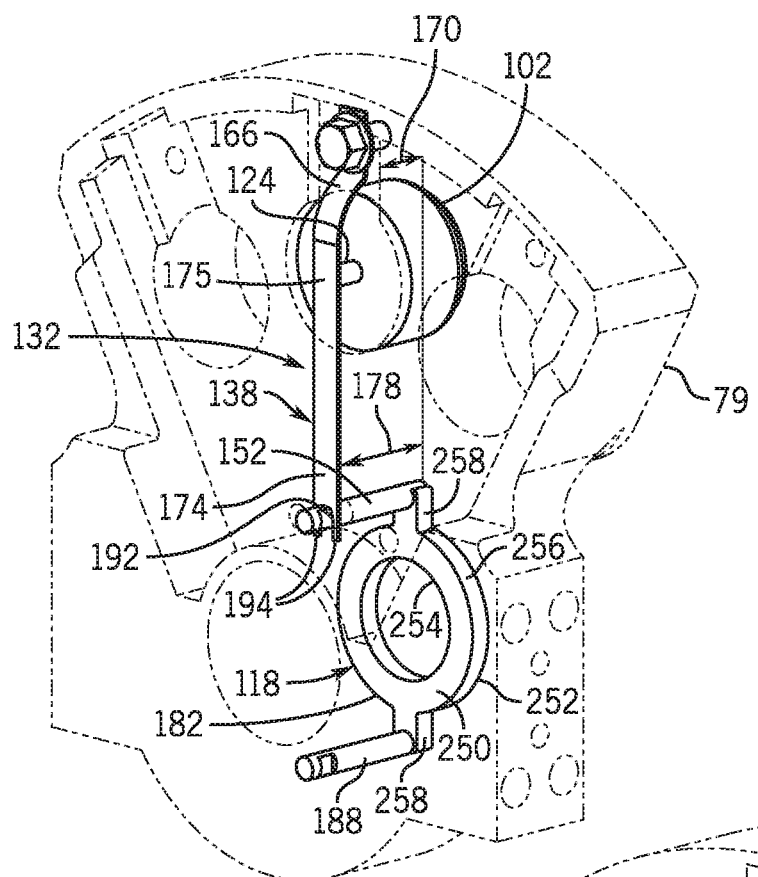
FIG. 12 is an isometric view of a second portion of the actuation apparatus and clutch arrangement removed from the power transmission assembly of FIG. 4 for the example starter-generator device.
Figure 13:
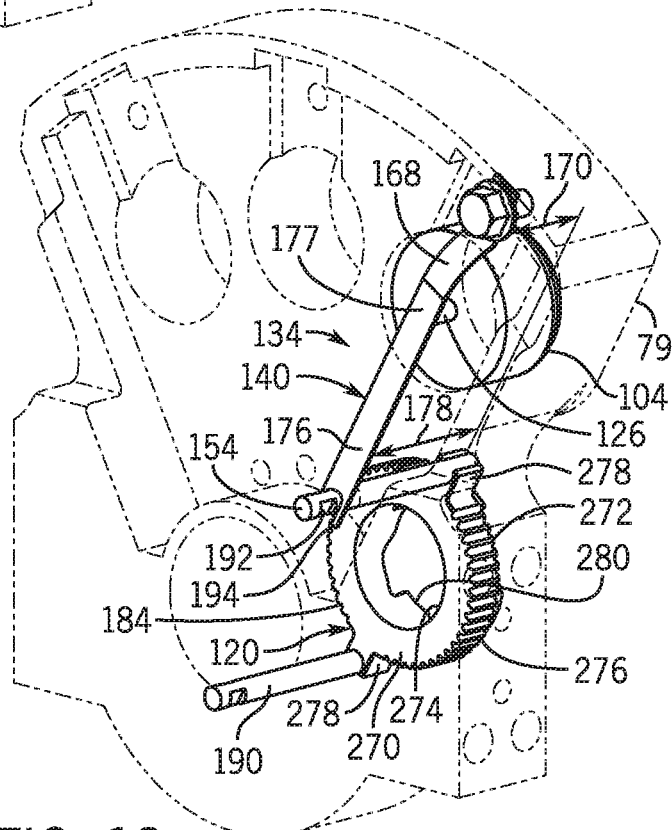
FIG. 13 is an isometric view of a third portion of the actuation apparatus and clutch arrangement removed from the power transmission assembly of FIG. 4 for the example starter-generator device.

Each of the first, second, and third actuator devices 100, 102, 104 is coupled to the clutch arrangement 72 via a linkage assembly 130, 132, 134 that includes a respective first, second, and third linkage 136, 138, 140 and may include one or more fulcrums 142, 144 that are positioned radially between the first, second, and third actuator device 100, 102, 104 and the actuation pin 150, 152, 154. Specifically, each of the first, second, and third linkage 136, 138, 140 functions as a lever extending between the respective actuator device 100, 102, 104 and an actuation pin 150, 152, 154 and is mounted to an outer radial portion of the reaction member 106 of the housing 76, for example by fasteners such as bolts 156. In other examples, the first, second, and third linkage 136, 138, 140 may be formed as a unitary part of the reaction member 106, eliminating the bolts 156. In this manner, the first, second, and third linkage 136, 138, 140 is affixed to the reaction member 106 at a radial distance 160 (FIG. 7) away from the central opening 84 that is beyond a radial distance 162 from the central opening 84 to the first, second, and third actuator device 100, 102, 104. Referring also to FIGS. 11-13, the shape of the first, second, and third linkage 136, 138, 140 provides an arrangement with a first end 164, 166, 168 of the respective first, second, and third linkage 136, 138, 140 affixed to the reaction member 106 at a first axial distance 170 from the respective low, high, and mid clutch 116, 118, 120 while a second end 172, 174, 176 of the respective first, second, and third linkage 136, 138, 140 is affixed to the respective actuation pin 150, 152, 154 at a second axial distance 178 that is greater than the first axial distance 170. Each of the first, second, and third linkage 136, 138, 140 also provides a coupling region 173, 175, 177 for receiving the respective armature 122, 124, 126 of the first, second, and third actuator device 100, 102, 104. Each coupling region 173, 175, 177 may couple and engage with the armature 122, 124, 126 by being positioned next to the armature 122, 124, 146 or may alternatively have fasteners or complementary interfitting features to maintain alignment.

As described below, the actuation pins 150, 152, 154 are axially repositionable within the clutch arrangement 72 to axially move portions of the clutch arrangement 72 between engaged and disengaged positions to modify the power transfer characteristics of the gear set 70. The actuation pins 150, 152, 154 may be supported by a stationary spindle or hub (not shown) that circumscribes the input shaft 86. The actuation pins 150, 152, 154 extend from an annular portion 180, 182, 184 of each of the low, high, and mid clutch 116, 118 120 that has teeth or other mating structures for selectively engaging a portion of the gear set 70. A second actuation pin 186, 188, 190 is provided on each clutch 116, 118, 120 that may be engaged by second actuator devices (not shown) of a second actuation apparatus to provide additional force or control to the low, high, and mid clutch 116, 118, 120 in a similar manner to the actuation apparatus 74. The actuation pin 150, 152, 154 engages with the respective second end 172, 174, 176 of the first, second, and third linkage 136, 138, 140 to move together axially. In the illustrated example, the actuation pin 150, 152, 154 includes a waist portion 192 that engages prongs 194 of the linkages 136, 138, 140 (FIGS. 11-13), although other complementary engagement structures may be employed. Each actuation pin 150, 152, 154 is illustrated as being formed as a unitary part of the respective low, high, and mid clutch 116, 118, 120, although in other examples may be a separate part assembled to the low, high, and mid clutch 116, 118 120. With this arrangement, for assembly, the low, high, and mid clutch 116, 118, 120 and the actuation pin 150, 152, 154 are mounted from one side (e.g., the electric machine side) of the actuation apparatus 74 and the corresponding first, second, and third linkage 136, 138, 140 is installed from the opposite side (e.g., the engine side) with the base 79 of the housing 76 therebetween.

Referring also to FIGS. 7A-9, the cover 78 of the housing 76 is a thin-walled member (e.g., formed of sheet metal) that is generally semicircular in shape to conform to the primary housing 76 or the area of the reaction member 106 formed within the primary housing 76. An aperture 200 at a radially inner portion 202 of the cover 78 is coaxially aligned with the central opening 84 of the housing 76. The cover 78 is stepped in the axial dimension to accommodate components of the actuation apparatus 74 with the radially inner portion 202 that is axially spaced away from the reaction member 106 followed by a radial mid portion 204 and a radial outer portion 206 that are progressively positioned axially closer to the reaction member 106. Other examples of the cover 78 may provide a radially curved or angled profile instead of the stepped arrangement.

The cover 78 also provides features to cooperate with the actuation apparatus 74. Fulcrums 142, 144 are formed proximate to or at the radial mid portion 204 of the cover 78 and extend toward the linkages 136, 140. The fulcrums 142, 144 are formed as a unitary part of the cover 78 (e.g., formed from the same material by the same process at the same time), for example by stamping or molding. Each fulcrum 142, 144 extends axially toward the reaction member 106 in the direction of the engine and is positioned to enable a corresponding one of the linkages 136, 140 to pivot, as discussed below, to move the second end 172, 176 in an opposite axial direction from the first end 164, 168. In other examples the fulcrums 142, 144 may be separate parts attached to the cover 78 or attached to the base 79. The cover 78 also forms a channel 208 extending radially in the area of corresponding linkages (e.g., linkage 138) that do not require pivoting to provide axial space for movement of the linkage 138 in the first direction 128. The arrangement of fulcrums 142, 144 and channel(s) 208 is therefore a function of the arrangement of the corresponding low, high, and mid clutches 116, 118, 120 for engagement and disengagement with the gear set 70. In the illustrated example, the fulcrums 142, 144 are configured to translate movement of the armature 122, 126 of the first and third actuator devices 100, 104 in the first direction 128 to movement of the respective clutch 116, 120 in a second axial direction 210 that is opposite to the first axial direction 128. It will be appreciated that the number of fulcrums 142, 144 or channels 208 may vary according to the position and desired axial movement of the low, high, and mid clutches 116, 118, 120 relative to the gear set 70, such that zero, one, two, three or more fulcrums may be provided and a corresponding number of channels are provided at the remaining linkages.

Figure 14:
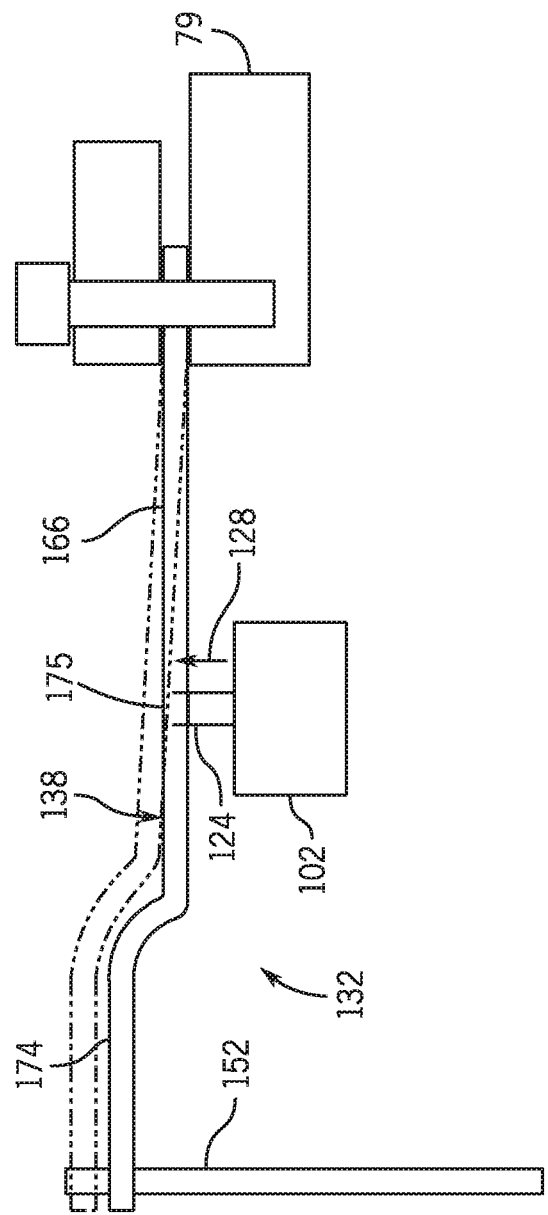
FIG. 14 is a schematic representation depicting the actuation of the first and third portions of the actuation apparatus and clutch arrangement shown in FIGS. 11 and 13.
Figure 15:
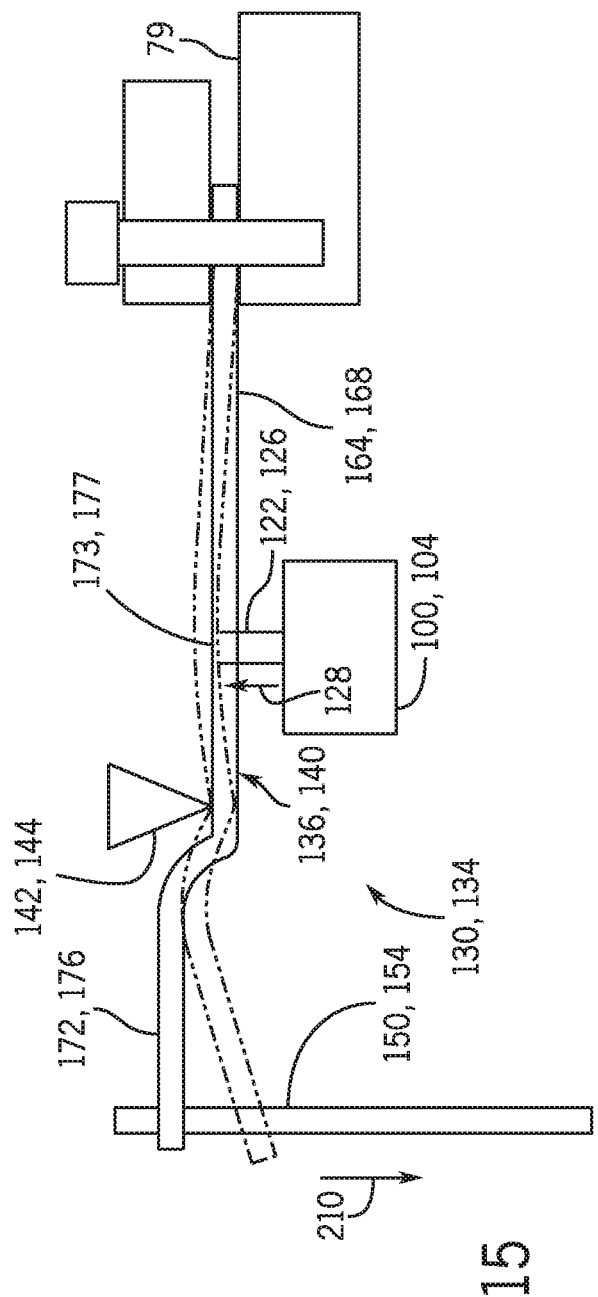
FIG. 15 is a schematic representation depicting the actuation of the second portion of the actuation apparatus and clutch arrangement shown in FIG. 12.

FIGS. 14 and 15 schematically depict an example mounting arrangement for the linkage assemblies 130, 132, 134. The linkages 136, 138, 140 and the corresponding actuation pins 150, 152, 154 move in response to the actuator devices 100, 102, 104 being energized, as shown in relief in FIGS. 14 and 15. When mounted without a fulcrum (FIG. 14), the linkage 138 is mounted from an unstressed state having an arcuate shape bending downward (in the orientation of FIG. 14) along the first end 166 and to the coupling region 175 to be forced to extend generally flat in the installed position. This prestresses the linkage 138 for resilient bias that tends to force the coupling region 175 and the second end 174 downward in the second axial direction 210. In use, the actuator device 102 is energized to extend the armature 124 in the first axial direction 128 and the second end 174 of the linkage 138 also moves in the first axial direction 128 (as shown in relief). The resilient biasing force of the linkage 138 is applied in the second axial direction 210 to the second end 174 and the actuation pin 152. In the illustrated example, to engage the high clutch 118, the actuator 102 is de-energized such that the armature 124 is allowed to retract under the resilient biasing force of the linkage 138, which also moves the actuation pin 152 in the second axial direction 210. To engage the clutch 118, the second actuator 102 is energized to move (e.g., extend) the armature 124 in the first axial direction 128, which also moves the second end 174 and the actuation pin 152 in the first axial direction 210.

When the fulcrum 142, 144 is provided (FIG. 15), the linkage 136, 140 is mounted from an unstressed state having an arcuate shape bending upward (in the orientation of FIG. 15) along the first end 164, 168 and to the coupling region 173, 177 to be forced to extend generally flat in the installed position, which prestresses the linkage 136, 140 for resilient bias. This prestresses the linkage 136, 140 for resilient bias that tends to force the coupling region 173, 177 and the second end 172, 176 upward in the first axial direction 128. In use, each of the first and third actuator device 100, 104 is configured to be energized to extend the armature 122, 126 in the first axial direction 128 and the second end 172, 176 of the linkage 136, 140 moves in the second axial direction 210 (as shown in relief). The resilient biasing force of the linkage 136, 140 is applied in the first axial direction 128 to the second end 172, 176 and the actuation pin 150, 154. In the illustrated example, to engage the clutch 116, 120, the respective actuator 100, 104 is energized to move the actuation pin 150, 154 in the second axial direction 210. To disengage the clutch 116, 120, the respective actuator 100, 104 is de-energized such that the armature 122, 126 is allowed to retract under the resilient biasing force of the linkage 136, 138 pivotably engaged with the fulcrum 142, 144, which also moves the actuation pin 150, 154 in the first axial direction 128.

The desired movement of each of the low, high, and mid clutch 116, 118, 120 is provided by a combination of factors including the orientation of the first, second, and third actuator 100, 102, 104, the state (energized or de-energized) of the first, second, and third actuator 100, 102 104, the presence of the fulcrum 142, 144, and the resilient bias of the first, second, and third linkage 136, 138, 140. In either arrangement (FIG. 14 or 15), when the respective actuator device 100, 102, 104 is energized to extend the armature 122, 124, 126 in the first axial direction 128, the second end 172, 174, 176 of the first, second, and third linkage 136, 138, 140 overcomes the resilient bias to move the actuation pin 150, 152, 154. When the respective actuator device 100, 102, 104 is deactivated, the resilient bias of the first, second, and third linkage 136, 138, 140 moves the second end 172, 174, 176 of the first, second, and third linkage 136, 138, 140 toward its unstressed position and depresses the armature 122, 124, 126. Therefore, the resilient bias of the linkages 136, 138, 140 is configured to move the second end 172, 174, 176 in the opposite axial direction of movement caused by energizing the respective actuator device 100, 102, 104.

The linkages 136, 138, 140 of the illustrated example are a composite lever and spring made from a resilient material, for example leaf springs formed from spring metal or a polymeric composition. As an alternative to the example leaf spring, the linkages 136, 138, 140 may be resiliently biased by any number of other structures. In one example, the first, second, and third linkage 136, 138, 140 may be a hybrid structure with a first portion (e.g., one or two of the first end 164, 166, 168; the coupling region 173, 175, 177; and the second end 172, 174, 176) formed of a relatively resilient material and the remainder as a second portion (e.g., the other one or two of the first end 164, 166, 168; the coupling region 173, 175, 177; and the second end 172, 174, 176) formed of a relatively rigid material. In other examples, the first, second, and third linkage 136, 138, 140 may be generally rigid and a spring (not shown) may be provided on one of various locations such as the cover 78, the base 79, a stationary portion of the gear set 70, or a respective clutch 116, 118, 120 such that, upon de-energizing of the respective one of the first, second, and third actuator device 100, 102, 104, the spring biases the corresponding one of the low, high, and mid clutch 116, 118, 120 back into the corresponding deactivated position (engaged or disengaged depending on the arrangement of the clutch). In another example, a spring (not shown) may be provided within the first, second, and third actuator devices 100, 102, 104 such that, upon de-energizing of the first, second, and third actuator devices 100, 102, 104, the springs pull the corresponding armature 122, 124, 126, and thus, the linkage assemblies 130, 132, 134, actuation pin 150, 152, 154, and low, high, and mid clutch 116, 118, 120 back from the activated positions.

Figure 10:
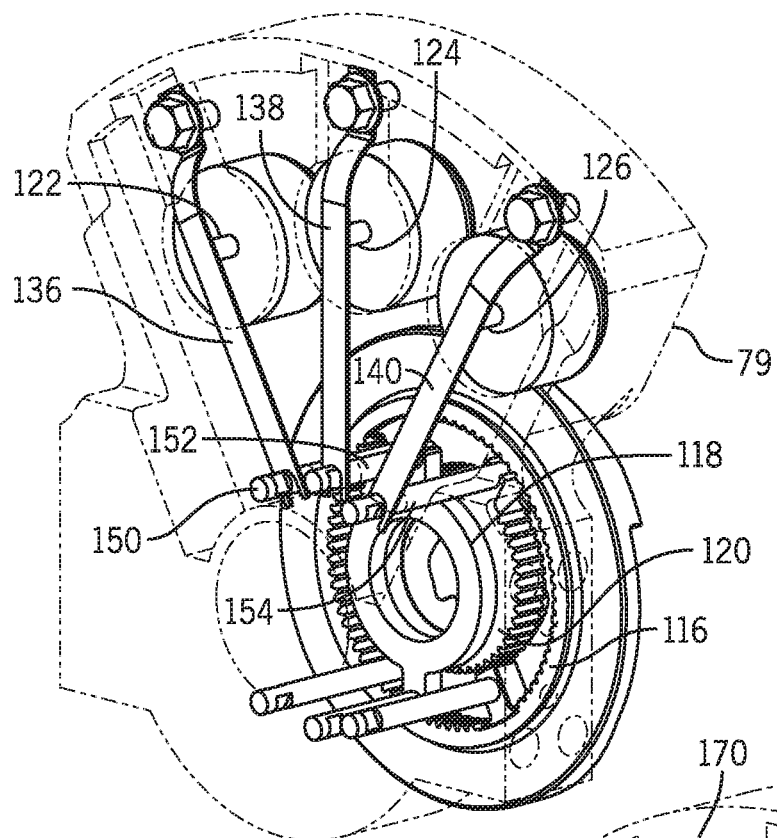
FIG. 10 is an isometric view of the actuation apparatus and clutch arrangement removed from the power transmission assembly of FIG. 4 for the example starter-generator device.

FIGS. 10-13 are isometric views of components of the clutch arrangement 72 and the actuation assembly 74 removed from the power transmission assembly 40. The view of FIG. 10 depicts a complete set of the first, second, and third actuator devices 100, 102, 104, while FIGS. 11-13 depict subsets of the first, second, and third actuator devices 100, 102, 104 associated with individual low, high, and mid clutches 116, 118, 120 of the clutch arrangement 72. The low, high, and mid clutches 116, 118, 120 may be considered "shifting" or "dog" clutches that are selectively actuated to modify power flow within the power transmission assembly 40.

As an example, FIG. 11 depicts the first actuator device 100 mounted on the reaction member 106 and coupled to the actuation pin 150 via the linkage 136 to actuate the low clutch 116 of the clutch arrangement 72. As described in greater detail below, the low clutch 116 is repositionable between an engaged position and a disengaged position relative to the gear set 70 in order to modify the power transfer through the gear set 70. In one example, the low clutch 116 is particularly engaged during a cold engine start mode to enable the electric machine 42 to drive the engine 30 at a first power ratio.

The linkage 136 extends between the armature 122 and the actuation pin 150 and is pivotable about the fulcrum 142 on the cover 78. As a result of the armature 122 moving out of the first actuator device 100 in the first axial direction 128, the linkage 136 is pivoted about the fulcrum 142 to move the low clutch 116 in the second axial direction 210, e.g., into the gear set 70. The arrangement of the linkage assembly 130 enables the first actuator device 100 to use leverage with the reaction member 106 and the fulcrum 142 to facilitate operation in a more compact and efficient manner, for example, by enabling advantageous use of beneficial lever ratios as a function of travel and force. In this example, the first actuator device 100 is energized for engagement of the low clutch 116.

As shown in FIGS. 10 and 11, the low clutch 116 is generally ring shaped with a first (or electric machine-side) face 230, a second (or engine-side) face 232, an inner perimeter 234, and an outer perimeter 236. The inner perimeter 234 may be splined to facilitate mounting the low clutch 116 (e.g., on a spindle or another element within or proximate to the gear set 70). A set of tabs 238 is positioned on the inner perimeter 234 and mount or form the actuation pins 150, 186, such that axial movement of the pins 150, 186 by the first actuator device 100 (and optionally a second actuator device coupled to the actuation pin 186) functions to axially reposition the low clutch 116. The low clutch 116 additionally includes one or more teeth 240 extending from the second face 232 to engage elements of the gear set 70.

As a further example, FIG. 12 depicts the second actuator device 102 mounted on the reaction member 106 and coupled to the actuation pin 152 via the linkage assembly 132 to actuate the high clutch 118 of the clutch arrangement 72. As described in greater detail below, the high clutch 118 is repositionable between an engaged position and a disengaged position relative to the gear set 70 in order to modify the power transfer through the gear set 70. In one example, the high clutch 118 is particularly engaged during a boost mode to enable the electric machine 42 to drive the engine 30 at a third power ratio or during a generation mode to enable the engine 30 to drive the electric machine 42 at the third power ratio.

The linkage 138 extends between the armature 124 and the actuation pin 152. As a result of the armature 124 moving out of the second actuator device 102 in the first axial direction 128, the first and second ends 166, 174 of the linkage 138 moves the high clutch 118 in the first axial direction 128, e.g., away from the gear set 70. The arrangement of the linkage assembly 132 enables the second actuator device 102 to operate in a more compact and efficient manner. In this example, the second actuator device 102 is energized for disengagement of the high clutch 118.

As shown in FIGS. 10 and 12, the high clutch 116 is generally ring shaped with a first (or electric machine-side) face 250, a second (or engine-side) face 252, an inner perimeter 254, and an outer perimeter 256. A set of tabs 258 is positioned on the outer perimeter 256 and mount or form the actuation pins 152, 188, such that axial movement of the pins 152, 188 by the second actuator device 102 (and optionally a second actuator device coupled to the actuation pin 188) functions to axially reposition the high clutch 118. The high clutch 118 may be secured into position and/or mounted on a sliding hub 260 (FIG. 8) or other support element. Additional details regarding the high clutch 118, particularly regarding the engagement of the high clutch 118 with the gear set 70, are provided below.

As a still further example, FIG. 13 depicts the third actuator device 104 mounted on the reaction member 106 and coupled to the actuation pin 154 via the linkage assembly 134 to actuate the mid clutch 120 of the clutch arrangement 72. As described in greater detail below, the mid clutch 120 is repositionable between an engaged position and a disengaged position relative to the gear set 70 in order to modify the power transfer through the gear set 70. In one example, the mid clutch 120 is particularly engaged during a warm engine start mode to enable the electric machine 42 to drive the engine 30 at a second power ratio.

The linkage 140 extends between the armature 126 and the actuation pin 154 and is pivotable about the fulcrum 144 on the cover 78. As a result of the armature 126 moving out of the third actuator device 104 in the first axial direction 128, the linkage 140 is pivoted to move the second end 176 and the mid clutch 120 in the second axial direction 210, e.g., into the gear set 70. The arrangement of the linkage assembly 134 enables the third actuator device 104 to use leverage with the reaction member 106 and the fulcrum 144 to facilitate operation in a more compact and efficient manner, for example, by enabling advantageous use of beneficial lever ratios as a function of travel and force. In this example, the third actuator device 104 is energized for engagement of the mid clutch 120.

As shown in FIGS. 10 and 13, the mid clutch 120 is generally ring shaped with a first (or electric machine-side) face 270, a second (or engine-side) face 272, an inner perimeter 274, and an outer perimeter 276. The outer perimeter 276 may be splined to facilitate mounting the mid clutch 120 (e.g., on a spindle or another element within or proximate to the gear set 70). A set of tabs 278 is positioned on the outer perimeter 276 to form or mount the actuation pins 154, 190, such that axial movement of the pins 154, 190 by the third actuator device 104 (and optionally an additional third actuator device coupled to the actuation pin 190) functions to axially reposition the mid clutch 120. As partially shown in FIG. 12 and discussed in greater detail below, the mid clutch 120 additionally includes one or more teeth 280 extending from the second face 272 to engage elements of the gear set 70. Additional details regarding the mid clutch 120, particularly regarding the engagement of the mid clutch 120 with the gear set 70, are provided below. As also shown in FIG. 10, the low clutch 116 and mid clutch 120 are sized such that the mid clutch 120 may be concentrically arranged within the low clutch 116. Other arrangements may be provided.

In each clutch example, the actuator devices 100, 102, 104 are mounted to the electric machine-side of the reaction member 106 at the recesses 110, 112, 114 (FIG. 5) and on the outer perimeter of the base 79. The first, second, and third actuator devices 100, 102, 104 may be secured to the recesses 110, 112, 114 in any suitable manner, such as by screws or other fasteners.

As introduced above, the first, second, and third actuator devices 100, 102, 104 may be electromechanical solenoid actuators that generate linear movement at a respective armature 122, 124, 126 by manipulating an induced magnetic field within the first, second, and third actuator devices 100, 102, 104. As the first, second, and third actuator devices 100, 102, 104 are energized, the armatures 122, 124, 126 extend in the first axial direction 128 out of the first, second, and third actuator devices 100, 102, 104 to engage or disengage the respective low, high, and mid clutch 116, 118, 120. In one example without a fulcrum, the second actuator device 102 may be energized during disengagement and de-energized during engagement, although arrangements may vary. The first, second, and third actuator devices 100, 102, 104 are relatively low-profile devices that enable a smaller overall package. Although three actuator devices are provided in the depicted example, other embodiments may only have fewer actuator devices (e.g., one or two) or more than three actuator devices (e.g., four, five, or six).

The operation of the gear set 70, clutch arrangement 72, and actuation apparatus 74 will now be described with reference to FIG. 8, which is a cross-sectional view through an axial plane of the power transmission assembly 40. As introduced above, the gear set 70 of the power transmission assembly 40 is configured to transfer power between the pulley 60 and the drive plate 90. The gear set 70 is generally housed within an annular gear housing 300, portions of which, in this example, rotate with aspects of the gear set 70. Bearings may be providing within the gear housing 300 to enable rotation of certain elements relative to stationary portions.

In the view of FIG. 5, a first side of the power transmission assembly 40 is oriented towards the electric machine 42, and a second side of the power transmission assembly 40 is oriented towards the engine 30. As noted above, the input shaft 86 may be directly connected to the power transfer element 56 with a fastener or other mechanism; and in further examples, the input shaft 86 may be coupled through intermediate components, such as a flange or boss. It should be noted that, although the shaft 86 is described as an "input" shaft, it may transfer power both into and out of the power transmission assembly 40, depending on the mode, as described below. The input shaft 86 generally extends through the power transmission assembly 40 along the primary rotational axis 65.

Figure 8:
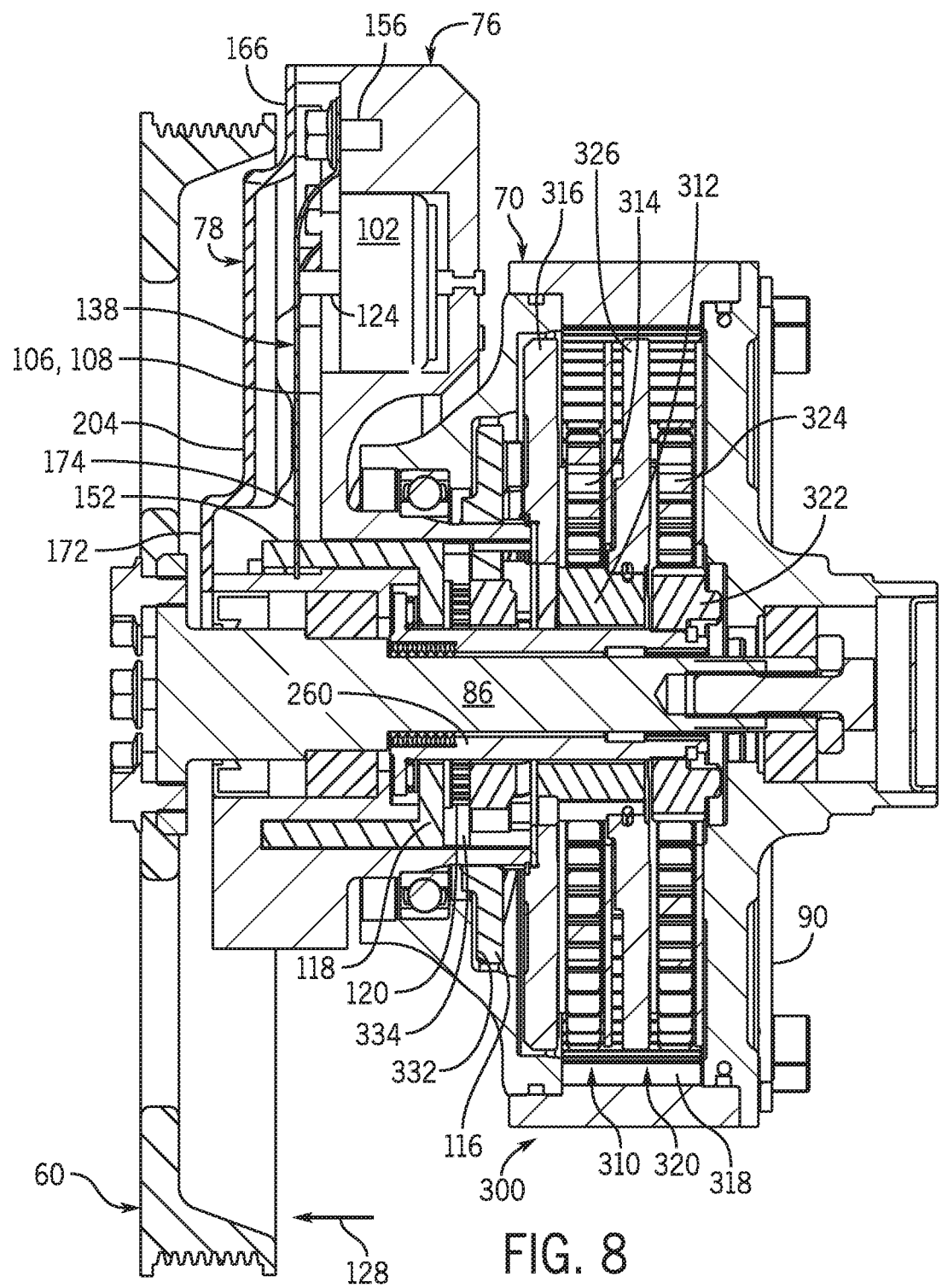
FIG. 8 is a side cross-sectional view of the power transmission assembly through line 8-8 of FIG. 7 for the example starter-generator device.

Referring to FIG. 8, the gear set 70 of the power transmission assembly 40, in this example, is a two-stage planetary gear set that enables the power transmission assembly 40 to interface with the electric machine 42 (e.g., via the power transfer belt arrangement 50) and the engine 30 (e.g., via direct coupling to the crank shaft 46 of the engine 30). In some embodiments, the input shaft 86 may be considered part of the gear set 70. Although one example configuration of the gear set 70 is described below, other embodiments may have different configurations.

The gear set 70 includes a first-stage planetary gear set 310 having a first-stage sun gear 312 mounted for rotation on the input shaft 86. The first-stage sun gear 312 includes a plurality of teeth or splines that mesh with a set of first-stage planet gears 314 that circumscribe the first-stage sun gear 312. In one example, the first-stage planet gears 314 include a single circumferential row of one or more planet gears, although other embodiments may include radially stacked rows, each with an odd number of planet gears in the radial direction.

The first-stage planet gears 314 are supported by a first-stage planet carrier 316, which circumscribes the first-stage sun gear 312, as well as the input shaft 86, and is at least partially formed by first and second radially extending, axially facing carrier plates. The first-stage carrier plates of the first-stage planet carrier 316 include a row of mounting locations for receiving axles extending through and supporting the first-stage planet gears 314 for rotation. As such, in this arrangement, each of the planet axles respectively forms an individual axis of rotation for each of the first-stage planet gears 314, and the first-stage planet carrier 316 enables the set of first-stage planet gears 314 to collectively rotate about the first-stage sun gear 312.

The first-stage planetary gear set 310 further includes a ring gear 318 that circumscribes the first-stage sun gear 312 and the first-stage planet gears 314. The ring gear 318 includes radially interior teeth that engage the teeth of the first-stage planet gears 314. As such, first-stage planet gears 314 extend between, and engage with, the first-stage sun gear 312 and the ring gear 318. With respect to the first-stage planetary gear set 310, the rotatable gear housing 300 and/or ring gear 318 may function as the power transfer element 54 relative to the engine 30. In this example, the rotatable gear housing 300 or ring gear 318 includes a number of castellations (not shown) that extend axially about the circumference of the axial face that faces the engine 30. The castellations engage and rotatably fix the ring gear 318 to the crank shaft 46 of the engine 30. The ring gear 318 and/or rotatable gear housing 300 may be considered output and/or input elements of the power transmission assembly 40 to receive rotational input in both power flow directions.

The gear set 70 further includes a second-stage planetary gear set 320 second-stage sun gear 322 that is generally hollow and cylindrical, extending between first and second ends and circumscribing the input shaft 86. The first-stage planet carrier 316 has a splined engagement with, or is otherwise fixed to, the second-stage sun gear 322 proximate to the second end. Additionally, the second-stage sun gear 322 may include a series of splines that mesh with a set of second-stage planet gears 324. The second-stage planet gears 324 are supported by a second-stage planet carrier 326 formed by first and second planet carrier plates. The second-stage planet gears 324 are positioned to additionally engage with the ring gear 318. The second-stage planet gears 324 each have an axle that extends between the two carrier plates that enable each planet gear 324 to rotate relative to the planet carrier 326 about the respective axle. As such, the second-stage planet gears 324 are positioned in between, and engage with each of, the second-stage sun gear 322 and the ring gear 318. Each second-stage planet gear 324 has the same or a different number of teeth relative to a corresponding first-stage planet gear 314.

As introduced above, the clutch arrangement 72 of the power transmission assembly 40 is configured to selectively engage and disengage with various components of the planetary gear set 70 to modify the power flow according to the modes noted above. The actuation apparatus 74 operates to actuate the clutch arrangement 72. In particular, one or more of the first, second, and third actuator devices 100, 102, 104 selectively extend the respective armature 122, 124, 126 in the first axial direction 128 along with the attached first end 164, 166, 168 of the respective first, second, or third linkage 136, 138, 140; and in response, the second end 172, 174, 176 of the respective first, second, or third linkage 136, 138, 140 moves in either the first axial direction 128 or the second axial direction 210. If a fulcrum 142, 144 is positioned to interact with the linkage 136, 140, then the second end 172, 176 will move in the second axial direction 210 due to pivoting about the fulcrum 142, 144. Conversely, if a fulcrum is not preset as in the example of the second linkage 138, the pushing of the first end 166 of the respective linkage 138 in the first axial direction 128 also moves the second end 174 of the linkage 138 in the first axial direction 128. As a result, the respective low, high, and mid clutch 116, 118, 120 is moved into either the engaged position or the disengaged position based on the state of the respective actuator device 100, 102, 104 in cooperation with the arrangement and nature of the respective linkages 136, 138, 140 and fulcrums 142, 144.

The gear set 70 includes at least one engagement element 332 that enables interaction between the gear set 70 and a respective one of the low, high, and mid clutches 116, 118, 120. Generally, low clutch engagement elements 332 are configured as slots, locks, slides, sleeves, or pockets that interact with the low clutch 116. In this example, the first engagement elements 332 may be in the form of one or more slots or locks on the second-stage planet carrier 326. The first engagement elements 332 operate to receive a portion of the low clutch 116 to lock the second-stage planet carrier 326 to a stationary housing element, i.e., to ground the second-stage planet carrier 326 and prevent rotation.

For the cold engine start mode, as the first actuator device 100 is engaged, the armature 122 extends out of the first actuator device 100 to pivot the linkage 136 about the fulcrum 142 such that the actuation pin 150 axially repositions the low clutch 116 into the gear set 70 to ground the second-stage planet carrier 326. The mid and high clutches 120, 118 are maintained in the disengaged positions. With the mid clutch 120 in the disengaged position, the first-stage planet carrier 316 is not locked to any stationary housing portion; and with the high clutch 118 is in the disengaged position the input shaft 86 is not locked to the ring gear 318. As will now be described, this configuration enables operation in the cold engine start mode.

Initially in the cold engine start mode, the engine 30 may be inactive, and activation of the ignition by an operator in the cabin 28 of the work vehicle 20 energizes the electric machine 42 to operate as a motor. In particular and additionally referring to FIG. 3, the electric machine 42 rotates the pulley 62 in the first clock direction D1, thereby driving the belt 64 and pulley 60 in the first clock direction D1. The pulley 60 drives the input shaft 86, in the first clock direction D1. Rotation of the input shaft 86 drives rotation of the first-stage sun gear 312, and in turn, rotation of the first-stage sun gear 312 drives rotation of the first-stage planet gears 314. The first-stage planet gears 314 drive the first-stage planet carrier 316, which as noted above is splined with the second-stage sun gear 322. As a result, the first-stage planet carrier 316 drives the second-stage sun gear 322 and thus the second-stage planet gears 324. As noted above, the second-stage planet carrier 326 is grounded by the low clutch 116. As such, rotation of the second-stage planet gears 324 operates to drive the ring gear 318. Since the number of second-stage planet gears 324 in the power flow path is an odd number (e.g., 1), the second-stage planet gears 324 drive the ring gear 318 in the opposite direction (e.g., the second clock direction D2) relative to the second-stage sun gear 322 rotating in the first clock direction D1. As noted above, the ring gear 318 functions as part of the power transfer element 54 to interface with the drive plate 90 mounted to the engine 30 to drive and facilitate engine start. In effect, during the cold engine start mode, the power transmission assembly 40 operates as a sun-in, ring-out configuration. In order to transition into another mode, the first actuator device 100 in this example is de-energized and the low clutch 116 is moved back into the disengaged position. This movement is due to the resilient bias of the linkage 136 causing the second end 172 to move in an opposite axial direction to the direction moved by the armature 122 of the actuator device 100.

In one example, the power transmission assembly 40 provides a 15:1 gear ratio in the power flow direction of the cold engine start mode. In other embodiments, other gear ratios (e.g., 10:1-30:1) may be provided. Considering a 4:1 gear ratio from the power transfer belt arrangement 50, a resulting 60:1 gear ratio (e.g., approximately 40:1 to about 120:1) may be achieved for the starter-generator device 32 between the electric machine 42 and the engine 30 during the cold engine start mode. As such, if for example the electric machine 42 is rotating at 10,000 RPM, the drive plate 90 mounted to the engine 30 rotates at about 100-150 RPM. In one example, the power transmission assembly 40 may deliver a torque of approximately 3000 Nm to the engine 30. Accordingly, the electric machine 42 may thus have normal operating speeds with relatively lower speed and higher torque output for cold engine start up.

For a warm engine start mode, the mid clutch 120 is in the disengaged position and configured to be actuated by the third actuator device 104 via the linkage assembly 134 and actuation pin 154. As the third actuator device 104 is energized, the armature 126 extends out of the third actuator device 104 to pivot the linkage 140 about the fulcrum 144 such that the actuation pin 154 axially repositions the mid clutch 120 into the gear set 70. In this example, the third actuator device 104 is energized for engagement.

The gear set 70 includes at least one engagement element 334 that enables interaction between the gear set 70 and the mid clutch 120. Generally, the mid clutch engagement elements 334 are configured as slots, locks, or pockets that interact with the mid clutch 120. In this example, the mid clutch engagement elements 334 may be in the form of one or more slides or locks that are axially moved to engage the first-stage planet carrier 316 in order to lock the first-stage planet carrier 316 to a stationary housing element, i.e., to ground the first-stage planet carrier 316 and prevent rotation.

When the mid clutch 120 is engaged, the power transmission assembly 40 is configured to operate in the warm engine start mode. In the warm engine start mode, the third actuator device 104 is engaged to extend the armature 126 to pivot the linkage 140, thereby axially shifting the second end 176 of the linkage 140 and the actuation pin 154 in the second axial direction 210 such that the mid clutch 120 engages the gear set 70 to ground the first-stage planet carrier 316. The low and high clutches 116, 118 are maintained in the disengaged positions. With the low clutch 116 in the disengaged position, the second-stage planet carrier 326 is not locked to any stationary housing portion; and with the high clutch 118 in the disengaged position, the input shaft 86 is not locked to the ring gear 318. As will now be described, this configuration enables operation in the warm engine start mode.

In the warm engine start mode, the engine 30 may be initially inactive or active. In any event, the controller 36 energizes the electric machine 42 to operate as a motor. In particular and additionally referring to FIG. 3, the electric machine 42 rotates the pulley 62 in the first clock direction D1, thereby driving the belt 64 and pulley 60 in the first clock direction D1. The pulley 60 drives the input shaft 86, in the first clock direction D1. Since the first-stage sun gear 312 is mounted on the input shaft 86, rotation of the input shaft 86 also rotates the first-stage sun gear 312. In turn, rotation of the first-stage sun gear 312 drives rotation of the first-stage planet gears 314. Since the first-stage planet carrier 316 and second-stage sun gear 322 are grounded, rotation of the first-stage planet gears 314 drives rotation of the ring gear 318. Since the number of first-stage planet gears 314 in the power flow path is an odd number (e.g., 1), the first-stage planet gears 314 drive the ring gear 318 in the opposite direction (e.g., the second clock direction D2) relative to the input shaft 86 and the first-stage sun gear 312 rotating in the first clock direction D1. As noted above, the ring gear 318 functions as the power transfer element 54 to interface with the drive plate 90 mounted to the engine 30 to drive and facilitate engine start. In effect, during the warm engine start mode, the power transmission assembly 40 operates as a sun-in, ring-out configuration, albeit at a lower gear ratio as compared to the cold engine start mode. In order to transition into another mode, the third actuator device 104 is disengaged (de-energized, in this example) and the mid clutch 120 may be moved back into the disengaged position under the resilient biasing force of the linkage 140 (or other resilient spring force source).

In one example, the power transmission assembly 40 provides a 4:1 gear ratio in the power flow direction of the warm engine start mode. In other embodiments, other gear ratios (e.g., 3:1-7:1) may be provided. Considering a 4:1 gear ratio from the power transfer belt arrangement 50, a resulting 16:1 gear ratio (e.g., approximately 12:1 to about 28:1) may be achieved for the starter-generator device 32 between the electric machine 42 and the engine 30 during the warm engine start mode. As such, if for example the electric machine 42 is rotating at 10,000 RPM, the drive plate 90 mounted to the engine 30 rotates at about 600-700 RPM. In one example, the torque output of the power transmission assembly 40 for the engine 30 is approximately 400-600 Nm. Accordingly, the electric machine 42 may thus have normal operating speeds with a relatively lower speed and higher torque output for engine start up.

For a boost mode and a generation mode, the high clutch 118 is configured to be actuated by the second actuator device 102 via the linkage assembly 132 and actuation pin 152. As noted above, the high clutch 118 may be mounted such that the high clutch 118 circumscribes the sliding hub 260. As the second actuator device 102 is provided with the engage command, the armature 124 extends out of the second actuator device 102 in the first axial direction 128 and likewise move both the first and second ends 166, 174 of the linkage 138 such that the actuation pin 152 axially repositions the high clutch 118 into the gear set 70. In this example, the second actuator device 102 is energized for disengagement and de-energized for engagement. As such, the energized actuation of the second actuator device 102 maintains or positions the high clutch 118 in the disengaged position. Subsequently, to transition into the engaged position, current to the second actuator device 102 may be discontinued and the resilient biasing force of the linkage 138 urges the high clutch 118 into the engaged position.

The sliding hub 260 enables interaction between the gear set 70 and the high clutch 118. Generally, repositioning the sliding hub 260 selectively locks the input shaft 86 relative to the ring gear 318, thus locking the input shaft 86 to the ring gear 318. In particular, the first-stage sun gear 312 is splined to the sliding hub 260. As the high clutch 118 is engaged, a spring pushes the sliding hub 260, and thus the first-stage sun gear 312, such that the first-stage sun gear 312 engages a cover of the ring gear 318, thereby resulting in a rotational connection between the input shaft 86 and the ring gear 318. Generally, instead of or in addition to the sliding hub 260, high clutch engagement elements may have any suitable configuration, including slots, locks, or pockets that receive the first-stage sun gear 322, in this example, based on the position of the sliding hub 260 and high clutch 118.

With the low clutch 116 in the disengaged position, the second-stage planet carrier 326 is not locked to any stationary housing portion; and with the mid clutch 120 in the disengaged position, the first-stage planet carrier 316 is not locked to any stationary housing portion. In this arrangement, the power transmission assembly 40 is configured to operate in the boost mode or the generation mode. In order to transition into another mode, the second actuator device 102 is disengaged (e.g., energized, in this example) and the high clutch 118 may be moved back into the disengaged position.

In the boost mode, the engine 30 is active and the electric machine 42 operates as a motor. In particular and additionally referring to FIG. 3, the electric machine 42 rotates the pulley 62 in the first clock direction D1, thereby driving the belt 64 and pulley 60 in the first clock direction D1. The pulley 60 drives the element 56, and thus the input shaft 86, in the first clock direction D1. Rotation of the input shaft 86 drives rotation of the first-stage sun gear 312, and in turn, rotation of the first-stage sun gear 312 drives rotation of the first-stage planet gears 314.

As noted above, the input shaft 86 is locked to the ring gear 318 by the high clutch 118 (in cooperation with the sliding hub 260 and first-stage sun gear 312). As a result, rotation of the input shaft 86 drives the ring gear 318, as well as of the first-stage sun gear 312, the first-stage planet gears 314, the first-stage planet carrier 316, the second-stage sun gear 322, and the second-stage planet gears 324, about the primary rotational axis 65. In effect, the gear set 70 rotates as a unit about the primary rotational axis 65. Since the other components of the planetary gear set 70 rotate with the input shaft 86, the ring gear 318 is driven in the same second clock direction D2. As noted above, the ring gear 318 functions as part of the power transfer element 54 to interface with the drive plate 90 mounted to the engine 30 to drive the engine 30. In effect, during the boost mode, the power transmission assembly 40 operates as a sun-in, ring-out configuration.

In one example, the power transmission assembly 40 provides a 1:1 gear ratio in the power flow direction of the boost mode. In other embodiments, other gear ratios may be provided. Considering a 4:1 gear ratio from the power transfer belt arrangement 50, a resulting 4:1 gear ratio may be achieved for the starter-generator device 32 between the electric machine 42 and the engine 30 during the boost mode. As such, if for example the electric machine 42 is rotating at 10,000 RPM, the drive plate 90 mounted to the engine 30 rotates at about 2500 RPM. Accordingly, the electric machine 42 may thus have normal operating speeds while providing an appropriate boost speed to the engine 30.

The power transmission assembly 40 has the same configuration to provide a generation mode as in the boost mode. However, in the generation mode, the engine 30 drives the power transmission assembly 40 and thus the electric machine 42. For the generation mode (and subsequent to the engine start modes and/or the boost mode), the engine 30 begins to accelerate above a rotational speed provided by the power transmission assembly 40, and the electric machine 42 is commanded to decelerate and to cease providing torque to power transmission assembly 40. After the engine 30 has stabilized to a sufficient speed and the electric machine 42 has sufficiently decelerated or stopped, the high clutch 118 is engaged as described above to operate the power transmission assembly 40 in the generation mode.

In the generation mode, the engine 30 rotates the drive plate 90 engaged with the ring gear 318, thus driving the ring gear 318 in the second clock direction D2. The ring gear 318 drives the first-stage planet gears 314 and the second-stage planet gears 324, which respectively drive the first-stage sun gear 312 and the second-stage sun gear 322, and further driving input shaft 86. Therefore, as the ring gear 318 rotates in the second clock direction D2, the input shaft 86 is driven and similarly rotates in the second clock direction D2 at the same rate of rotation. As noted above, the input shaft 86 is connected with and provides output power to the electric machine 42 in the second clock direction D2 via the power transfer belt arrangement 50. In effect, during the generation mode, the power transmission assembly 40 operates as a ring-in, sun-out configuration.

In one example, the power transmission assembly 40 provides a 1:1 gear ratio in the power flow direction of the generation mode. In other embodiments, other gear ratios may be provided. Considering a 4:1 gear ratio from the power transfer belt arrangement 50, a resulting 4:1 gear ratio may be achieved for the starter-generator device 32 between the electric machine 42 and the engine 30 during the generation mode. As a result, the electric machine 42 may thus have normal operating speeds in both power flow directions with relatively low toque output during power generation.

Thus, various embodiments of the vehicle electric system have been described that include an integrated starter-generator device. The combination starter-generator may include a clutch arrangement with first, second, and third clutches that are actuated with actuator devices such as electromechanical solenoid devices mounted on an actuation assembly. In this manner, the clutches are axially repositioned relative to the gear set to axially shift between engaged and disengaged positions, thereby modifying the power flow within the power transmission assembly. The clutch arrangements may be configured to engage or disengage via movement in either axial direction as desired. Additional actuator devices may be provided to engage and move the second actuation pins of the clutches. As a result of the unidirectional actuator devices mounted on one side, the part costs and assembly time are reduced and potential assembly errors are mitigated. The unitary construction of the fulcrums, linkages, and/or the actuation pins further simplify manufacturing and assembly. The use of the unidirectional electromechanical solenoid devices to reposition the locking dog clutches provides a compact transmission and starter-generator assembly that may not require high pressure electro-hydraulic solenoids, while enabling improved packaging, wire routing, and package size.

Various transmission assemblies may be included in the device, thus reducing the space occupied by the system. The transmission assembly may provide multiple speeds or gear ratios and transition between speeds/gear ratios. One or more clutch arrangements may be used to selectively apply torque to the gear set of the transmission assembly in both power flow directions. Direct mechanical engagement with the engine shaft reduces the complexity and improves reliability of the system. Using planetary gear sets in the transmission assembly provides high gear reduction and torque capabilities with reduced backlash in a compact space envelope. As a result of the bi-directional nature of the power transmission assembly, the power transfer belt arrangement may be implemented with only a single belt tensioner, thereby providing a relatively compact and simple assembly. Additionally, by using the power transfer belt arrangement with belt and pullies to couple together and transfer power between the electric machine and the power transmission assembly, instead of directly connecting and coupling the electric machine to the power transmission assembly, the electric machine may be mounted apart from the transmission assembly to better fit the engine in a vehicle engine bay. Additionally, by using the belt and pullies to couple the electric machine to the power transmission assembly, an additional gear ratio (e.g., a 4:1 ratio) may be achieved. Embodiments discussed above include a double planetary gear set, sun in, ring out configuration to provide warm and cold engine start modes and a ring in, sun out configuration to provide a generation mode. As such, a four-mode assembly may be provided.

Also, the following examples are provided, which are numbered for easier reference.

1. A combination starter-generator device for a work vehicle having an engine, the starter-generator device comprising: a gear set configured to transmit power flow to and from the engine; a first clutch having a first actuation pin and shiftable into a disengaged position in which the first clutch is decoupled from the gear set and into an engaged position in which the first clutch is coupled to the gear set; a second clutch having a second actuation pin and shiftable into a disengaged position in which the second clutch is decoupled from the gear set and into an engaged position in which the second clutch is coupled to the gear set; a first actuator device applying a first actuation force to a first armature in a first axial direction; a first linkage defining a first end that is fixed and extending to a second end coupled to the first actuation pin of the first clutch, the first armature engaging the first linkage at a coupling region between the first and second ends; a second actuator device applying a second actuation force to a second armature in the first axial direction; and a second linkage defining a first end that is fixed and extending to a second end coupled to the second actuation pin of the second clutch, the second armature engaging the second linkage at a coupling region between the first and second ends; wherein the first actuator device extends the first armature in the first axial direction to move the second end of the first linkage in the first axial direction; wherein the first clutch is moved into either the engaged position or the disengaged position by the coupling region of the first linkage moving in the first axial direction and the second end of the first linkage moving in the first axial direction; and wherein the first clutch is moved into the other of the engaged position or the disengaged position by the coupling region of the first linkage moving in a second axial direction and the second end of the first linkage moving in the second axial direction, the second axial direction being opposite the first axial direction; and wherein the second actuator device extends the second armature in the first axial direction to move the second end of the second linkage in the second axial direction; wherein the second clutch is moved into either the engaged position or the disengaged position by the coupling region of the second linkage moving in the first axial direction and the second end of the second linkage moving in the second axial direction; and wherein the second clutch is moved into the other of the engaged position or the disengaged position by the coupling region of the second linkage moving in the second axial direction and the second end of the second linkage moving in the first axial direction.

2. The combination starter-generator device of example 1, further comprising a fulcrum engaged by the second linkage at a position on the second linkage between the coupling region and the second end; wherein engagement of the second linkage with the fulcrum moves the second end of the second linkage in the second axial direction when the second actuator device extends the second armature to move the coupling region of the second linkage in the first axial direction.

3. The combination starter-generator device of example 2, further comprising a housing at least in part supporting the second linkage; wherein the fulcrum is formed as a unitary part of the housing.

4. The combination starter-generator device of example 1, further comprising a housing with a reaction member on which both the first actuator device and the second actuator device are mounted relative to the gear set; wherein the first actuator device and the second actuator device are oriented on a same side of the reaction member relative to the first and second clutches.

5. The combination starter-generator device of example 4, wherein the reaction member is a generally annular member having a central opening; and wherein at least one of the first linkage and the second linkage is affixed to the reaction member at a radial distance away from the central opening that is beyond a radial distance from the central opening to the respective first or second actuator device.

6. The combination starter-generator device of example 4, wherein the first linkage is affixed to the reaction member at a first axial distance from the first clutch and affixed to the actuation pin at a second axial distance from the first clutch, wherein the second axial distance is greater than the first axial distance.

7. The combination starter-generator device of example 4, wherein the first end of the first linkage is affixed to the reaction member.

8. The combination starter-generator device of example 1, wherein the first linkage resiliently biases the second end of the first linkage in the second axial direction, and wherein the first actuator device extends the first armature in the first axial direction to overcome the resilient bias; and wherein the second linkage resiliently biases the second end of the second linkage in the first axial direction, and wherein the second actuator device extends the second armature in the first axial direction to overcome the resilient bias.

9. The combination starter-generator device of example 8, wherein at least one of the first linkage and the second linkage includes a leaf spring.

10. The combination starter-generator device of example 8, wherein at least one of the first linkage and the second linkage is a composite structure including a first portion that is resilient and a second portion that is rigid relative to the first portion.

11. The combination starter-generator device of example 1, wherein at least one of the first actuation pin and the second actuation pin is formed unitary with the respective first or second clutch.

12. The combination starter-generator device of example 1, wherein the first linkage resiliently biases the first clutch toward the engaged position and the second linkage resiliently biases the second clutch toward the disengaged position.

13. The combination starter-generator device of example 1, wherein the first actuator device and the second actuator device are electromechanical push solenoids configured to provide an actuation force in only the first axial direction.

14. The combination starter-generator device of example 1, further comprising: a third clutch having a third actuation pin and shiftable into a disengaged position in which the third clutch is decoupled from the gear set and into an engaged position in which the third clutch is coupled to the gear set; a third actuator device applying an actuation force to a third armature only in the first axial direction; and a third linkage defining a first end that is fixed and extending to a second end that is coupled to the third actuation pin of the third clutch, the third armature engaging the third linkage at a coupling region between the first and second ends; wherein the third actuator device extends the third armature in the first axial direction to move the first end of the third linkage in the first axial direction and to move the second end of the third linkage in either the first axial direction or a second axial direction opposite the first axial direction; and wherein the third clutch is moved into the disengaged position or the engaged position by movement of the second end of the third linkage in the first axial direction or the second axial direction.

15. A combination starter-generator device for a work vehicle having an engine, the starter-generator device comprising: an electric machine defining a rotation axis; a gear set configured to receive rotational input from the electric machine and from the engine and to couple the electric machine and the engine, the gear set configured to operate in one of at least a first gear ratio, a second gear ratio, or a third gear ratio; two or more clutches selectively coupled to the gear set to effect the first, second, and third gear ratios, the two or more clutches including a first clutch having a first actuation pin and a second clutch having a second actuation pin, each of the two or more clutches shiftable into a disengaged position in which the clutch is decoupled from the gear set and into an engaged position in which the clutch is coupled to the gear set; an actuation assembly including: a first electromechanical solenoid device applying an actuation force to a first armature only in a first axial direction parallel to the rotation axis; and a second electromechanical solenoid device applying an actuation force to a second armature only in the first axial direction; a first linkage defining a first end that is fixed and extending to a second end that is coupled to the first actuation pin of the first clutch, the first armature engaging the first linkage at a coupling region between the first and second ends; and a second linkage defining a first end that is fixed and extending to a second end that is coupled to the second actuation pin of the second clutch, the second armature engaging the second linkage at a coupling region between the first and second ends; wherein the first electromechanical solenoid device extends the first armature in the first axial direction to move the second end of the first linkage in the first axial direction; wherein the first clutch is moved into either the engaged position or the disengaged position by the coupling region of the first linkage moving in the first axial direction and the second end of the first linkage moving in the first axial direction; and wherein the first clutch is moved into the other of the engaged position or the disengaged position by the coupling region of the first linkage moving in a second axial direction and the second end of the first linkage moving in the second axial direction, the second axial direction being opposite the first axial direction; and wherein the second electromechanical solenoid device extends the second armature in the first axial direction to move the second end of the second linkage in the second axial direction; wherein the second clutch is moved into either the engaged position or the disengaged position by the coupling region of the second linkage moving in the first axial direction and the second end of the second linkage moving in the second axial direction; and wherein the second clutch is moved into the other of the engaged position or the disengaged position by the coupling region of the second linkage moving in the second axial direction and the second end of the second linkage moving in the first axial direction.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A combination starter-generator device for a work vehicle having an engine, the starter-generator device comprising:
    a gear set configured to transmit power flow to and from the engine;
    a first clutch having a first actuation pin and shiftable into a disengaged position in which the first clutch is decoupled from the gear set and into an engaged position in which the first clutch is coupled to the gear set;
    a second clutch having a second actuation pin and shiftable into a disengaged position in which the second clutch is decoupled from the gear set and into an engaged position in which the second clutch is coupled to the gear set;
    a first actuator device applying a first actuation force to a first armature in a first axial direction;
    a first linkage defining a first end that is fixed and extending to a second end coupled to the first actuation pin of the first clutch, the first armature engaging the first linkage at a coupling region between the first and second ends;
    a second actuator device applying a second actuation force to a second armature in the first axial direction; and
    a second linkage defining a first end that is fixed and extending to a second end coupled to the second actuation pin of the second clutch, the second armature engaging the second linkage at a coupling region between the first and second ends;
    wherein the first actuator device extends the first armature in the first axial direction to move the second end of the first linkage in the first axial direction; wherein the first clutch is moved into either the engaged position or the disengaged position by the coupling region of the first linkage moving in the first axial direction and the second end of the first linkage moving in the first axial direction; and wherein the first clutch is moved into the other of the engaged position or the disengaged position by the coupling region of the first linkage moving in a second axial direction and the second end of the first linkage moving in the second axial direction, the second axial direction being opposite the first axial direction; and wherein the second actuator device extends the second armature in the first axial direction to move the second end of the second linkage in the second axial direction; wherein the second clutch is moved into either the engaged position or the disengaged position by the coupling region of the second linkage moving in the first axial direction and the second end of the second linkage moving in the second axial direction; and wherein the second clutch is moved into the other of the engaged position or the disengaged position by the coupling region of the second linkage moving in the second axial direction and the second end of the second linkage moving in the first axial direction.

2. The combination starter-generator device of claim 1, further comprising a fulcrum engaged by the second linkage at a position on the second linkage between the coupling region and the second end;

wherein engagement of the second linkage with the fulcrum moves the second end of the second linkage in the second axial direction when the second actuator device extends the second armature to move the coupling region of the second linkage in the first axial direction.

3. The combination starter-generator device of claim 2, further comprising a housing at least in part supporting the second linkage;

wherein the fulcrum is formed as a unitary part of the housing.

4. The combination starter-generator device of claim 1, further comprising a housing with a reaction member on which both the first actuator device and the second actuator device are mounted relative to the gear set; wherein the first actuator device and the second actuator device are oriented on a same side of the reaction member relative to the first and second clutches.

5. The combination starter-generator device of claim 4, wherein the reaction member is a generally annular member having a central opening; and wherein at least one of the first linkage and the second linkage is affixed to the reaction member at a radial distance away from the central opening that is beyond a radial distance from the central opening to the respective first or second actuator device.

6. The combination starter-generator device of claim 4, wherein the first linkage is affixed to the reaction member at a first axial distance from the first clutch and affixed to the actuation pin at a second axial distance from the first clutch, wherein the second axial distance is greater than the first axial distance.

7. The combination starter-generator device of claim 4, wherein the first end of the first linkage is affixed to the reaction member.

8. The combination starter-generator device of claim 1, wherein the first linkage resiliently biases the second end of the first linkage in the second axial direction, and wherein the first actuator device extends the first armature in the first axial direction to overcome the resilient bias; and wherein the second linkage resiliently biases the second end of the second linkage in the first axial direction, and wherein the second actuator device extends the second armature in the first axial direction to overcome the resilient bias.

9. The combination starter-generator device of claim 8, wherein at least one of the first linkage and the second linkage includes a leaf spring.

10. The combination starter-generator device of claim 8, wherein at least one of the first linkage and the second linkage is a composite structure including a first portion that is resilient and a second portion that is rigid relative to the first portion.

11. The combination starter-generator device of claim 1, wherein at least one of the first actuation pin and the second actuation pin is formed unitary with the respective first or second clutch.

12. The combination starter-generator device of claim 1, wherein the first linkage resiliently biases the first clutch toward the engaged position and the second linkage resiliently biases the second clutch toward the disengaged position.

13. The combination starter-generator device of claim 1, wherein the first actuator device and the second actuator device are electromechanical push solenoids configured to provide an actuation force in only the first axial direction.

14. The combination starter-generator device of claim 1, further comprising:

a third clutch having a third actuation pin and shiftable into a disengaged position in which the third clutch is decoupled from the gear set and into an engaged position in which the third clutch is coupled to the gear set;

a third actuator device applying an actuation force to a third armature only in the first axial direction; and a third linkage defining a first end that is fixed and extending to a second end that is coupled to the third actuation pin of the third clutch, the third armature engaging the third linkage at a coupling region between the first and second ends;

wherein the third actuator device extends the third armature in the first axial direction to move the first end of the third linkage in the first axial direction and to move the second end of the third linkage in either the first axial direction or a second axial direction opposite the first axial direction; and wherein the third clutch is moved into the disengaged position or the engaged position by movement of the second end of the third linkage in the first axial direction or the second axial direction.

15. The combination starter-generator device of claim 14, further comprising a fulcrum engaged by the third linkage at a position on the third linkage between the coupling region and the second end;

wherein actuation of the third actuator device extends the third armature in the first axial direction and engagement of the third linkage with the fulcrum moves the second end of the third linkage in the second axial direction to shift the third clutch into either the engaged position or the disengaged position.

16. A combination starter-generator device for a work vehicle having an engine, the starter-generator device comprising:

an electric machine defining a rotation axis;

a gear set configured to receive rotational input from the electric machine and from the engine and to couple the electric machine and the engine, the gear set configured to operate in one of at least a first gear ratio, a second gear ratio, or a third gear ratio;

two or more clutches selectively coupled to the gear set to effect the first, second, and third gear ratios, the two or more clutches including a first clutch having a first actuation pin and a second clutch having a second actuation pin, each of the two or more clutches shiftable into a disengaged position in which the clutch is decoupled from the gear set and into an engaged position in which the clutch is coupled to the gear set;

an actuation assembly including:
- a first electromechanical solenoid device applying an actuation force to a first armature only in a first axial direction parallel to the rotation axis; and
- a second electromechanical solenoid device applying an actuation force to a second armature only in the first axial direction;

a first linkage defining a first end that is fixed and extending to a second end that is coupled to the first actuation pin of the first clutch, the first armature engaging the first linkage at a coupling region between the first and second ends; and a second linkage defining a first end that is fixed and extending to a second end that is coupled to the second actuation pin of the second clutch, the second armature engaging the second linkage at a coupling region between the first and second ends;

wherein the first electromechanical solenoid device extends the first armature in the first axial direction to move the second end of the first linkage in the first axial direction; wherein the first clutch is moved into either the engaged position or the disengaged position by the coupling region of the first linkage moving in the first axial direction and the second end of the first linkage moving in the first axial direction; and wherein the first clutch is moved into the other of the engaged position or the disengaged position by the coupling region of the first linkage moving in a second axial direction and the second end of the first linkage moving in the second axial direction, the second axial direction being opposite the first axial direction; and wherein the second electromechanical solenoid device extends the second armature in the first axial direction to move the second end of the second linkage in the second axial direction; wherein the second clutch is moved into either the engaged position or the disengaged position by the coupling region of the second linkage moving in the first axial direction and the second end of the second linkage moving in the second axial direction; and wherein the second clutch is moved into the other of the engaged position or the disengaged position by the coupling region of the second linkage moving in the second axial direction and the second end of the second linkage moving in the first axial direction.

17. The combination starter-generator device of claim 16, further comprising a fulcrum engaged by the second linkage at a position on the second linkage between the coupling region and the second end;
wherein engagement of the second linkage with the fulcrum moves the second end of the second linkage in the second axial direction when the second actuator device extends the second armature to move the coupling region of the second linkage in the first axial direction.

18. The combination starter-generator device of claim 17, further comprising:
a housing at least in part supporting the first linkage;
wherein the fulcrum is located at the housing; and
wherein engagement of the second linkage with the fulcrum moves the second end of the second linkage in the second axial direction when the second electromechanical solenoid device extends the second armature to move the first end of the second linkage in the first axial direction.

19. The combination starter-generator device of claim 16, further comprising a reaction member mounting both the first electromechanical solenoid device and the second electromechanical solenoid device to be oriented on a same side of the reaction member relative to the first and second clutches.

20. The combination starter-generator device of claim 16, further comprising a housing with a reaction member on which the first and second electromechanical solenoid devices are mounted relative to the gear set, the reaction member having a central opening;
wherein the first linkage is affixed to the reaction member at a radial distance away from a central opening in the reaction member that is beyond a radial distance from the central opening to the first electromechanical solenoid device; and
wherein the second linkage is affixed to the reaction member at a radial distance away from the central opening that is beyond a radial distance from the central opening to the second electromechanical solenoid device.

* * * * *